(12) United States Patent
Rabii et al.

(10) Patent No.: US 9,749,682 B2
(45) Date of Patent: Aug. 29, 2017

(54) TUNNELING HDMI DATA OVER WIRELESS CONNECTIONS

(71) Applicant: QUALCOMM Incorporated, San Diego, CA (US)

(72) Inventors: Khosro Mohammad Rabii, San Diego, CA (US); Vijay Naicker Subramaniam, San Diego, CA (US); Richard Dominic Wietfeldt, San Diego, CA (US); Fawad Shaukat, San Diego, CA (US); Shivakumar Balasubramanyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/734,824

(22) Filed: Jun. 9, 2015

(65) Prior Publication Data

US 2016/0366470 A1 Dec. 15, 2016

(51) Int. Cl.
*H04N 21/4363* (2011.01)
*H04N 21/643* (2011.01)
(Continued)

(52) U.S. Cl.
CPC ... *H04N 21/43635* (2013.01); *H04N 21/4367* (2013.01); *H04N 21/43615* (2013.01);
(Continued)

(58) Field of Classification Search
CPC ......... H04N 21/4367; H04N 21/43635; H04N 21/43637; H04N 21/4307; H04N 21/440218; H04N 21/64322
See application file for complete search history.

(56) References Cited

U.S. PATENT DOCUMENTS 8,873,453 B2 10/2014 Manapragada et al.
2006/0209890 A1* 9/2006 MacMullan ..... H04N 21/43615
370/468

(Continued)

FOREIGN PATENT DOCUMENTS

KR 20040076710 A 9/2004

OTHER PUBLICATIONS

"Wi-Fi Display Technical Specification—Version 1.0.0," Wi-Fi Alliance Technical Committee, Wi-Fi Display Technical Task Group, Aug. 24, 2012, 149 pp.
(Continued)

*Primary Examiner* — Hai V Tran
(74) *Attorney, Agent, or Firm* — Shumaker & Sieffert, P.A.

(57) ABSTRACT

Techniques are described for tunneling high definition multimedia interface (HDMI) data over a wireless connection from an HDMI-capable source device to a client device that is physically connected to an HDMI-capable sink device via an HDMI connector. The techniques enable wireless transmission of HDMI data without video compression by using an encapsulation scheme that maps HDMI audio and video channels into a transport stream format and maps HDMI side channels into an IP datagram for transmission over the wireless connection. The source device may operate as an HDMI controller and perform HDMI-based data, control, and security processing required for HDMI connectivity with the sink device via the client device. The client device, therefore, may be a "dummy" client device that does not perform HDMI-based processing, but acts as a wireless HDMI bridge to pass the HDMI data between the source device and the sink device.

26 Claims, 10 Drawing Sheets

(51) Int. Cl.
    *H04N 21/4367*     (2011.01)
    *H04N 21/4402*     (2011.01)
    *H04N 21/436*     (2011.01)

(52) U.S. Cl.
    CPC ............... *H04N 21/43637* (2013.01); *H04N 21/440218* (2013.01); *H04N 21/64322* (2013.01)

(56) References Cited

U.S. PATENT DOCUMENTS

| | | |
|---|---|---|
| 2006/0209892 A1 | 9/2006 | MacMullan et al. |
| 2008/0291324 A1 | 11/2008 | Hong et al. |
| 2011/0088056 A1* | 4/2011 | Ansari ............... H04N 21/4122 725/31 |
| 2011/0103472 A1 | 5/2011 | Lefebvre et al. |
| 2012/0311654 A1 | 12/2012 | Dougherty, III et al. |
| 2013/0088641 A1 | 4/2013 | Shao et al. |
| 2013/0179605 A1* | 7/2013 | Huang ............. H04N 21/43615 710/20 |
| 2014/0096165 A1* | 4/2014 | Bei ................. H04N 21/43637 725/81 |

OTHER PUBLICATIONS

International Search Report and Written Opinion from corresponding PCT/US2016/031023—ISA/EPO—dated Jul. 14, 2016 (13 pages).

\* cited by examiner

TUNNELING HDMI DATA OVER WIRELESS CONNECTIONS

TECHNICAL FIELD

The disclosure relates to transmission of video data and, more particularly, wireless transmission of high definition multimedia interface (HDMI) data.

BACKGROUND

High definition multimedia interface (HDMI) is a widely used interface for transferring uncompressed video data and compressed or uncompressed digital audio data between a HDMI-capable source device and a HDMI-capable sink device. In some examples, an HDMI-capable source device may be a set-top box, a DVD or Blu-Ray Disc player, a digital video recorder, a personal computer, a video game console, a "smart" phone or tablet, and the like. An HDMI-capable sink device may be a digital television, a digital audio receiver, a computer monitor, a video projector, or other audio and/or video display device. HDMI enables lossless transmission of video data between the source and sink devices. HDMI is limited, however, by the wired connections that are necessary to provide the bandwidth needed to transmit the uncompressed video data.

In addition to supporting HDMI, a source device, especially a mobile source device such as a "smart" phone or tablet, may also support Wireless Display (WD) or WiFi Display (WFD) systems, e.g., according to the Miracast™ standard. In a WD system, the source device transmits multimedia data, such as audio video (AV) data, audio data, and/or video data, over a wireless connection to one or more of the sink devices participating in a particular wireless display session. The wireless connection may be established directly between the source device and the one or more sink devices without the need for cables or a network connection. The multimedia data may be played back at both a local display of the source device and at each of the displays of the sink devices.

In some cases, so called "wireless HDMI" has been introduced. These systems typically require the use of compression to wirelessly transmit the video data and/or audio data between the source device and an HDMI-capable client device. The HDMI-capable client device may be referred to as a stick, a fob, a pod, or the like. The HDMI-capable client device is physically connected to the sink device via an HDMI connector, and wirelessly connected to the source device via a wireless connection. In this scenario, the client device may be configured to perform video and/or audio encoding and decoding for wireless transmission with the source device, and further configured to perform HDMI-based data, control and security processing for wired transmission with the sink device.

SUMMARY

In general, this disclosure relates to techniques for tunneling high definition multimedia interface (HDMI) data over a wireless connection from an HDMI-capable source device to a client device that is physically connected to an HDMI-capable sink device via an HDMI connector. The techniques enable wireless transmission of HDMI data without compression by using an encapsulation scheme that maps HDMI audio and video channels into a transport stream format and maps HDMI side channels into an IP datagram for transmission over the wireless connection. According to the techniques, the source device may operate as an HDMI controller and perform HDMI-based data, control, and security processing for HDMI connectivity with the sink device via the client device. The client device, therefore, may not be configured to perform HDMI based processing, but instead merely acts as a wireless HDMI bridge to pass the HDMI data between the source device and the sink device. In this case, the client device may be a "dummy" client device that essentially only includes a wireless transceiver and an HDMI connector.

In one example, this disclosure is directed to a method of processing data comprising establishing, by a source device, a wireless connection with at least one client device having a physical high definition multimedia interface (HDMI) connection to a sink device, processing, by the source device, HDMI control and security data for the physical HDMI connection between the client device and the sink device, encapsulating, by the source device, HDMI data for transmission over the wireless connection, the HDMI data including the HDMI control and security data, HDMI video data, and HDMI audio and auxiliary data, and transmitting, by the source device, the encapsulated HDMI data over the wireless connection to the client device for transfer to the sink device via the physical HDMI connection.

In another example, this disclosure is directed to a source device for processing data, the source device comprising a memory, and one or more processors in communication with the memory. The one or more processors are configured to establish a wireless connection with at least one client device having a physical high definition multimedia interface (HDMI) connection to a sink device, process HDMI control and security data for the physical HDMI connection between the client device and the sink device, encapsulate HDMI data for transmission over the wireless connection, the HDMI data including the HDMI control and security data, HDMI video data, and HDMI audio and auxiliary data, and transmit the encapsulated HDMI data over the wireless connection to the client device for transfer to the sink device via the physical HDMI connection.

In a further example, this disclosure is directed to a method of transmitting data comprising establishing, by a client device having a physical high definition multimedia interface (HDMI) connection to a sink device, a wireless connection with a source device, receiving, by the client device, encapsulated HDMI data over the wireless connection from the source device, generating, by the client device from the encapsulated HDMI data, HDMI data for transmission over the physical HDMI connection without performing any processing of the HDMI data, and transmitting, by the client device, the HDMI data to the sink device over the physical HDMI connection.

In another example, this disclosure is directed to a client device for transmitting data, the client device comprising a memory, and one or more processors in communication with the memory. The one or more processors being configured to establish a wireless connection with a source device, the client device having a physical high definition multimedia interface (HDMI) connection to a sink device, receive encapsulated HDMI data over the wireless connection from the source device, generate, from the encapsulated HDMI data, HDMI data for transmission over the physical HDMI connection without performing any processing of the HDMI data, and transmit the HDMI data to the sink device over the physical HDMI connection.

The details of one or more examples of the disclosure are set forth in the accompanying drawings and the description below. Other features, objects, and advantages will be apparent from the description and drawings, and from the claims.

DETAILED DESCRIPTION

This disclosure relates to techniques for tunneling high definition multimedia interface (HDMI) data over a wireless connection from an HDMI-capable source device to a client device that is physically connected to an HDMI-capable sink device via an HDMI connector. The techniques enable wireless transmission of HDMI data without compression by using an encapsulation scheme that maps HDMI audio and video channels into a transport stream format and maps HDMI side channels into an IP datagram for transmission over the wireless connection. According to the techniques, the source device may operate as an HDMI controller and perform HDMI-based data, control, and security processing for HDMI connectivity with the sink device via the client device. The client device, therefore, may be a "dummy" client device that does not perform HDMI-based processing, but instead merely acts as a wireless HDMI bridge to pass the HDMI data between the source device and the sink device.

Figure 1:
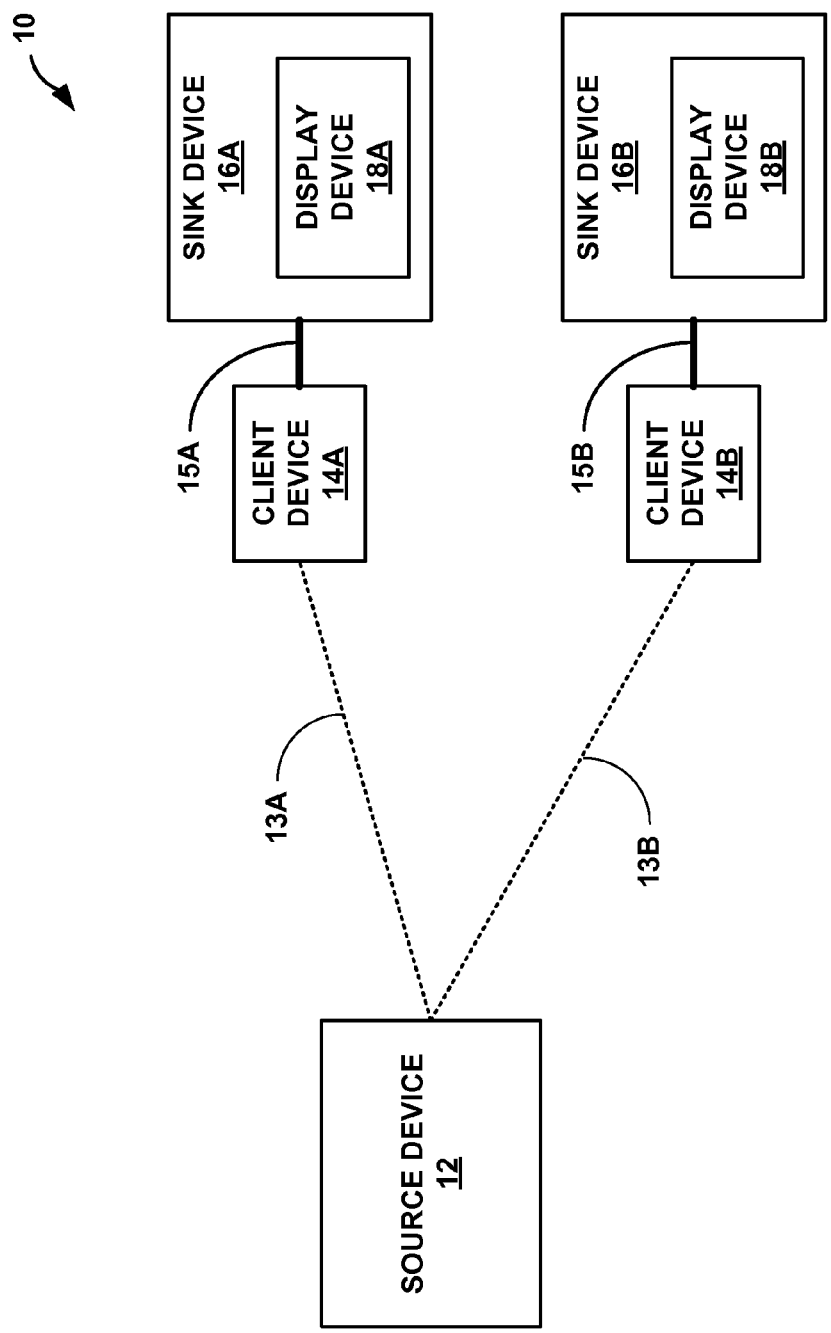
FIG. 1 is a block diagram illustrating a Wireless Display (WD) system including a source device and client devices with physical HDMI connections to sink devices.

FIG. 1 is a block diagram illustrating a Wireless Display (WD) system 10 including a source device 12 and client devices 14A and 14B (collectively "client devices 14") with physical HDMI connections 15A and 15B (collectively "physical HDMI connections 15") to sink devices 16A and 16B (collectively "sink devices 16"). Sink devices 16 includes respective display devices 18A and 18B (collectively "display devices 18"). As illustrated in FIG. 1, wireless connections 13A and 13B (collectively "wireless connections 13") are established between source device 12 and client devices 14.

In some examples, source device 12 may be a "smart" phone or other mobile handset, a tablet computer, a laptop computer, a personal computer, a set-top box, a DVD or Blu-Ray Disc player, a digital video recorder, a video game console, or another wireless communication device. In some examples, each of client devices 14 may be a wireless communication device that at least includes a wireless transceiver and an HDMI connector. For example, each of client devices 14 may be a stick, a fob, a pod, or the like. In some examples, each of sink devices 16 may be a digital television, a digital audio receiver, a computer monitor, a video projector, or other audio and/or video display device. Display devices 18 of sink devices 16 may each comprise any of a variety of display devices such as a cathode ray tube (CRT), a liquid crystal display (LCD), a plasma display, an organic light emitting diode (OLED) display, or another type of display device.

Each of source device 12, client devices 14 and sink devices 16 may include one or more processors, such as one or more digital signal processors (DSPs), general purpose microprocessors, application specific integrated circuits (ASICs), field programmable gate arrays (FPGAs), or other equivalent integrated circuitry or discrete logic circuitry. Although not shown in FIG. 1, each of source device 12, client devices 14 and sink devices 16 may include a memory comprised of any of a wide variety of volatile or non-volatile memory, such as dynamic random access memory (DRAM) including synchronous dynamic random access memory (SDRAM), magnetoresistive RAM (MRAM), resistive RAM (RRAM), read-only memory (ROM), non-volatile random access memory (NVRAM), electrically erasable programmable read-only memory (EEPROM), FLASH memory, and the like.

HDMI is a widely used interface for transferring uncompressed video data and compressed or uncompressed digital audio data between an HDMI-capable source device and an HDMI-capable sink device. The consistent upgrades to the HDMI standards practically guarantee that HDMI will be a continued presence in consumer electronic products for the foreseeable future. HDMI enables lossless transmission of video data between the source and sink devices. In addition, HDMI enables secure transmission of multimedia data between the source and sink devices using high-bandwidth digital content protection (HDCP). HDCP processing may include performing one or more of data encryption, device authentication, and key revocation to prevent unauthorized users from receiving the multimedia data.

Typically, HDMI requires a wired connection via an HDMI cable in order to provide the bandwidth needed to transmit the uncompressed video data. As an example, for the standard video format of 720 p at 30 frames per second (fps), HDMI requires a total bitrate of over 1200 Mbps, in other examples, HDMI requires over 1600 Mbps for the video format of 1080 p at 30 fps, HDMI requires over 1400 Mbps for the video format of 720 p at 50 fps, and HDMI requires over 1550 Mbps for the video format of 720 p at 60 fps. In an increasingly wireless world, however, wired connections and cables are not desirable. Moreover, the use of HDMI over long distances may be cost prohibitive. For example, the cost of a high-grade HDMI cable substantially increases beyond six-feet in length.

In some cases, so called "wireless HDMI" has been introduced. These systems typically require the use of compression to wirelessly transmit the video and/or audio data between a source device and an HDMI-capable client device. The HDMI-capable client device may be referred to as a stick, a fob, a pod, or the like. These types of HDMI-capable client devices have created a market for digital television and other sink device accessories to ease the reach of mobile devices and other source devices into consumer electronic devices.

The HDMI-capable client device has a physical HDMI connection with the sink device, and a wireless connection with the source device. The HDMI-capable client device may be required to provide multi-format, high-resolution audio and video data delivery to the sink device, and also act as a bridge connecting the source device, e.g., a personal mobile handset, and the sink device, e.g., a home entertainment platform. The HDMI-capable client device may be configured to perform video and/or audio encoding and decoding for wireless transmission with the source device, and further configured to perform HDMI-based data, control and security processing, including HDMI processing, for wired transmission with the sink device via the physical HDMI connection.

These "wireless HDMI" systems, however, do not provide lossless transmission of video data between source and sink devices, and, therefore, cannot match the quality provided by conventional wired or cabled HDMI systems. Moreover, the HDMI-capable client device must be constructed to provide video and/or audio compression and decompression, wireless transmission, and full HDMI-based processing. The HDMI-capable client device may, therefore, be relatively expensive in terms of manufacturing cost, development time, and HDCP licensing fees.

This disclosure describes techniques for tunneling HDMI data over wireless connections 13 from source device 12 to one or more of client devices 14 having physical HDMI connections 15 to HDMI-capable sink devices 16. The disclosed techniques enable wireless transmission of HDMI data between source device 12 and client devices 14 without compression, and further transfer of the HDMI data from client devices 14 to sink devices 16 via physical HDMI connections 15.

In accordance with the disclosed techniques, source device 12 is configured to support both HDMI and wireless display. Similarly, client devices 14 may be configured to support both HDMI and wireless display. For example, source device 12 and client devices 14 may support one of HDMI Version 1.3a released November 2006, HDMI Version 1.4A released March 2010, or HDMI Version 2.0 released September 2013. Additionally, source device 12 and client devices 14 may support the Miracast™ standard for wireless display, which is described in "Wi-Fi Display Technical Specification," Version 1.0.0, Wi-Fi Alliance Technical Committee, Wi-Fi Display Technical Task Group, August 2012.

Wireless connections 13 may be established between source device 12 and each of client devices 14 either over an existing WiFi network or as WiFi peer-to-peer (P2P) connections without the need for a wireless access point. For example, wireless connections 13 may be WiFi P2P connections established according to the WiFi Direct standard, which is described in "Wi-Fi Peer-to-Peer (P2P) Technical Specification," Version 1.1, Wi-Fi Alliance Technical Committee, Wi-Fi Direct Services Task Group. In either case, data may be transmitted over wireless connections 13 using one of the existing wireless communication standards, e.g., IEEE 802.11a, 802.11b, 802.11g, 802.11n, 802.11ac, 802.11ad, etc., or other wireless communication techniques.

According to the Miracast™ standard for wireless display, source device 12 may establish wireless display sessions with one or more client devices 14, including performing discovery, connection setup, capability negotiation, content protection, and session establishment. Further according to the Miracast™ standard, once the wireless display sessions are established, source device 12 may transmit multimedia (i.e., video and/or audio) data to client devices 14 over wireless connections 13.

As an example, source device 12 may establish the wireless display sessions between source device 12 and client devices 14 using Real-Time Streaming Protocol (RTSP) over a TCP/IP (Transmission Control Protocol/Internet Protocol) stack. As a further example, source device 12 may transmit multimedia data over the wireless connections 13 using packetized elementary streams (PES) in a transport stream format, e.g., MPEG-TS, over a RTP/UDP/IP (Real-time Transport Protocol/User Datagram Protocol/Internet Protocol) stack. MPEG transport stream (referred to as MPEG-TS or MPEG2-TS) is a standard container format for transmission and storage of video, audio, and auxiliary data, developed by the Moving Pictures Experts Group (MPEG) in ITU-T H.222: Information Technology—Generic coding of moving pictures and associated audio information: Systems, Telecommunication Standardization Sector of International Telecommunication Union (ITU), May 2006.

Upon receipt of the multimedia data over wireless connections 13 from source device 12, client devices 14 may, in turn, provide the multimedia data to sink devices 16 via physical HDMI connections 15 for display on display devices 18A and 18B (collectively "display devices 18") at sink devices 16. Each of sink devices 16 may then render the received multimedia data on its display device 18A, 18B. In some cases, client devices 14 may receive control data and/or user inputs from sink devices 16 via physical HDMI connections 15. According to the Miracast™ standard, the control data and/or user inputs may be sent from client devices 14 to source device 12 over wireless connections 13. Source device 12 then processes the received control data and/or user inputs associated with sink devices 16, and applies the effect of the control data and/or user inputs on subsequent multimedia data sent to sink devices 16 via client devices 14.

According to the techniques described in this disclosure, source device 12 is configured to tunnel HDMI data over wireless connections 13 according to an encapsulation scheme without compressing the HDMI video data. As described in more detail below, source device 12 applies the encapsulation scheme to map HDMI video and audio channels into a transport stream format, e.g., MPEG-TS, and map HDMI side channels into IP datagrams for transmission over wireless connections 13. The encapsulated uncompressed HDMI video data may then be transmitted over wireless connections 13 using higher bandwidth wireless communication standards, such as IEEE 802.11ad with multiple-input multiple-output (MIMO) that is capable of achieving bitrates of approximately 2 Gbps.

In accordance with the described techniques, source device 12 may operate as an HDMI controller and perform HDMI-based data, control, and security processing required for HDMI connectivity with sink devices 16 via client devices 14. As illustrated in FIG. 1, the techniques enable source device 12 to connect to two or more sink devices 16 via two or more respective client devices 14. In the illustrated example, source device 12 may provide a single unified control plane across all the connected sink devices 16.

With the HDMI-based processing moved to source device 12, client devices 14 may each be a "dummy" client device that essentially only includes a wireless transceiver and an HDMI connector. Client devices 14, therefore, may not be configured to perform HDMI-based processing, but instead merely act as wireless HDMI bridges to pass the HDMI data between source device 12 and the respective sink devices 16. For example, each of client devices 14 may be configured to receive encapsulated HDMI data from source device 12 over wireless connections 13, decapsulate the HDMI data, and transfer the HDMI data to a respective one of sink devices 16 over physical HDMI connections 15. In the opposite direction, each of client devices 14 may be configured to receive HDMI control data from a respective one of sink devices 16 over physical HDMI connections 15, encapsulate the HDMI control data, and transmit the HDMI control data to source device 12 over wireless connections 13. In this way, each of client devices 14 may be very low cost and low complexity, and avoid additional HDCP licensing fees.

Figure 2:
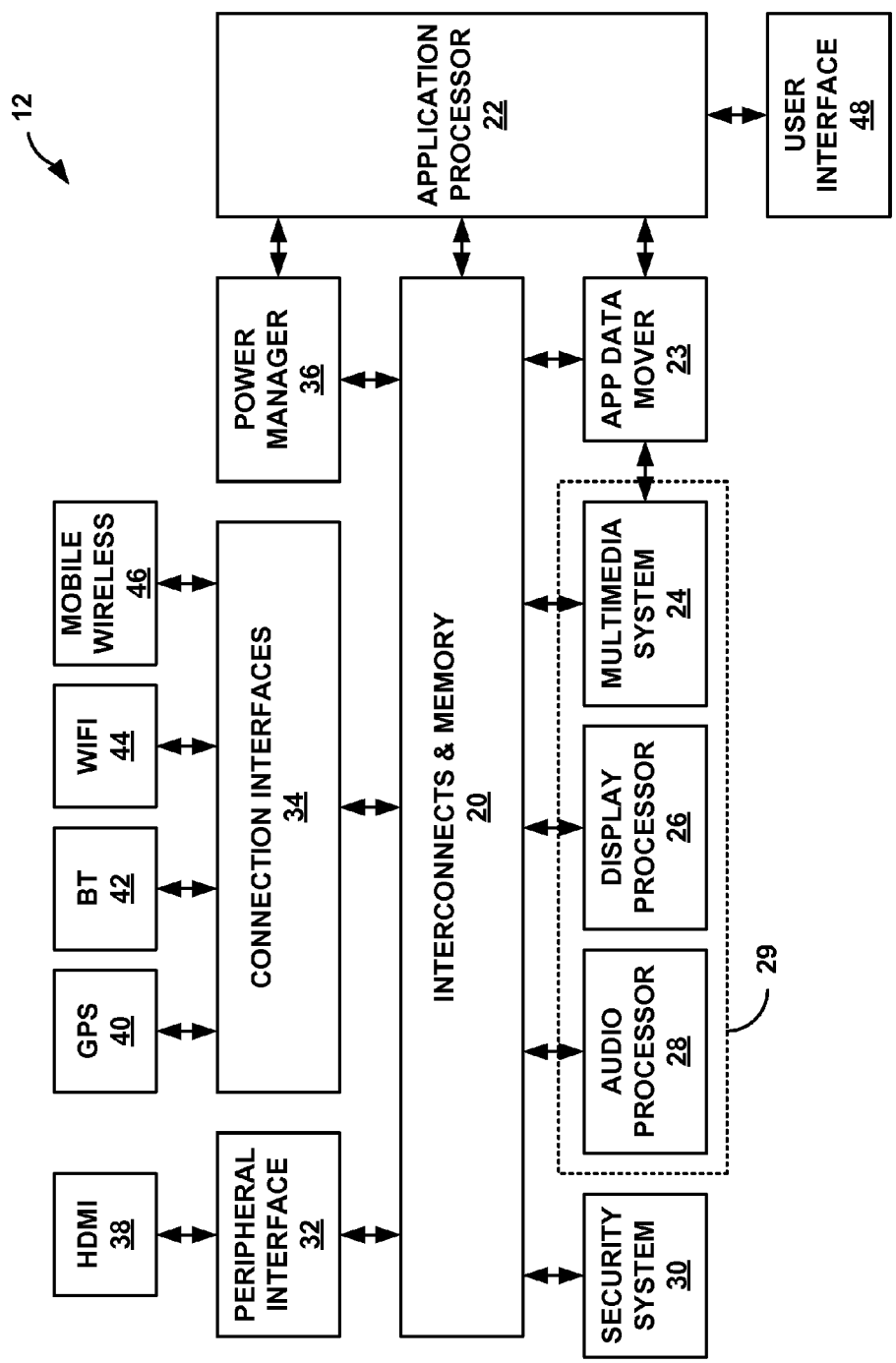
FIG. 2 is a block diagram illustrating an example source device of the WD system from FIG. 1.

FIG. 2 is a block diagram illustrating an example source device 12 of the WD system 10 from FIG. 1. Source device 12 is designed to support both HDMI and wireless display. In the example illustrated in FIG. 2, source device 12 includes HDMI system 38 as a peripheral interface 32 and WiFi system 44 as one of a plurality of connection interfaces 34. According to the techniques of this disclosure, source device 12 is configured to tunnel HDMI data over a wireless connection using WiFi system 44 to one or more client devices, e.g., client devices 14 from FIG. 1, having physical HDMI connections to respective sink devices, e.g., sink devices 16 from FIG. 1.

As illustrated in FIG. 2, source device 12 includes interconnects and memory 20, an application processor 22, an application data mover 23, audio video (AV) systems 29, peripheral interface 32, connection interfaces 34, power manager 36, and a user interface 48. In the illustrated example, AV systems 29 includes a multimedia system 24, a display processor 26, and an audio processor 28. In the illustrated example, peripheral interface 32 includes HDMI system 38. In other examples, peripheral interface 32 may include other types of interfaces to connect with peripheral devices, such as universal serial bus (USB) interface, a standard connector (SC) optical interface, and/or a secure digital card (SDC) interface. In the illustrated example, connection interfaces 34 include a global positioning system interface 40, a Bluetooth interface 42, WiFi system 44, and a mobile wireless interface 46.

In general, application processor 22 provides an environment in which a variety of applications may run on source device 12. Example applications include texting applications, email applications, streaming music applications, streaming video applications, picture slideshow applications, presentation applications, video conferencing applications, and the like. In some examples, application processor 22 may receive data for use by the applications from external sources, such as devices, storage systems, or servers, via peripheral interface 32 and/or connection interfaces 34. In other examples, application processor 22 may receive data for use by the applications from local sources and/or internal storage, such as interconnects and memory 20, a cache memory (not shown), integrated sensors (not shown), or user interface 48. In one example, source device 12 may comprise a mobile handheld device that includes an image sensor used for camera or video applications. Application data Mover 23 may move data for the applications between application processor 22, AV systems 29, and interconnects and memory 20.

Multimedia system 24 may process multimedia (e.g., combined audio and video (AV)) data received from the external or local sources for storage on memory within interconnects and memory 20, use by application processor 22, and/or presentation on source device 12. In some examples, multimedia system 24 may use a general purpose graphics processing unit (GPGPU) to process three dimensional (3D) graphics data for video game applications or other applications that require 3D representations. To present the application data on source device 12, audio processor 28 processes audio data for presentation on speakers (not shown) included in source device 12. In addition, display processor 26 processes video data for presentation on a local display (not shown) included in source device 12.

Display processor 26 may include both a local display processor to process video data for presentation on a local display (not shown) of source device 12, and an external display processor to process video data for presentation on an external display, e.g., one of display devices 18 of sink devices 16 from FIG. 1. The local display of source device 12 may be capable of providing only a low resolution rendering of the video data, whereas the external display may be capable of providing a high resolution or high definition (HD) rendering of the video data. In some cases, display processor 26 may process the same video data for display on both the local display and the external display.

Similarly, audio processor 28 may include both a local audio processor to process audio data for presentation on local speakers (not shown) of source device 12, and an external audio processor to process audio data for presentation on external speakers, e.g., at one of sink devices 16 from FIG. 1. The local speakers of source device 12 may be capable of providing either mono or stereo sound, whereas the external speakers may comprise an array of speakers configured to provide, for example, 5.1 digital surround sound. In some cases, audio processor 28 may process the same audio data for playback on both the local speakers and the external speakers. In some examples, audio processor 28 may include an audio codec to encode the processed audio data for transmission to the external speakers.

Source device 12 also includes power manager 36 that monitors battery status for source device 12. Power manager 36 may store battery status information that reflects whether source device 12 is wall plugged or using its battery reserve, and if using the battery reserve, the level of remaining battery power. In some cases, the battery status information may be displayed to the user of source device 12, e.g., using a small battery icon, lights or sounds to indicate different battery conditions. Power manager 36 may update the battery status information almost continuously to reflect an accurate battery status to the user of source device 12.

Source device 12 also includes security system 30 that may manage and apply any necessary security to data for transmission to external devices and connections with external devices via peripheral interface 32 or connection interfaces 34. As one example, security system 30 may manage authentication of the external devices. As another example, security system 30 may manage encryption of the data for transmission to the external devices and decryption of data received from the external devices. In some examples, security system 30 may be configured to perform security processing associated with HDCP, which may include performing one or more of data encryption, device authentication, and key revocation to prevent unauthorized users from receiving the data.

The components of source device 12 illustrated in FIG. 2 are merely exemplary, in other examples, source device 12 may include more, fewer, and/or different components. The components of source device 12 may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof.

Interconnects and memory 20 in source device 12 includes memory that may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like. Interconnects and memory 20 may comprise computer-readable storage media for storing media data, as well as other kinds of data. Interconnects and memory 20 may additionally store instructions and program code that are executed by application processor 22 and/or AV systems 29 as part of performing the techniques described in this disclosure.

According to the techniques of this disclosure, source device 12 is configured to operate as an HDMI controller and perform HDMI-based data, control, and security processing for HDMI connectivity with one or more sink devices via client devices, e.g., sink devices 16 via client devices 14 from FIG. 1. Source device 12 may perform the HDMI-based data, control and security processing using one or more of application processor 22, AV systems 29, security system 30 and HDMI system 38. As described in more detail below with respect to FIGS. 5 and 6, source device 12 is configured to wirelessly transmit the processed HDMI data without compression by using an encapsulation scheme that maps HDMI audio and video channels into a transport stream format and maps HDMI side channels into an IP datagram for transmission over a wireless connection using WiFi system 44. Source device 12 may perform the wireless display based processing of the encapsulated HDMI data using one or more of application processor 22, AV systems 29, and WiFi system 44.

Figure 3:
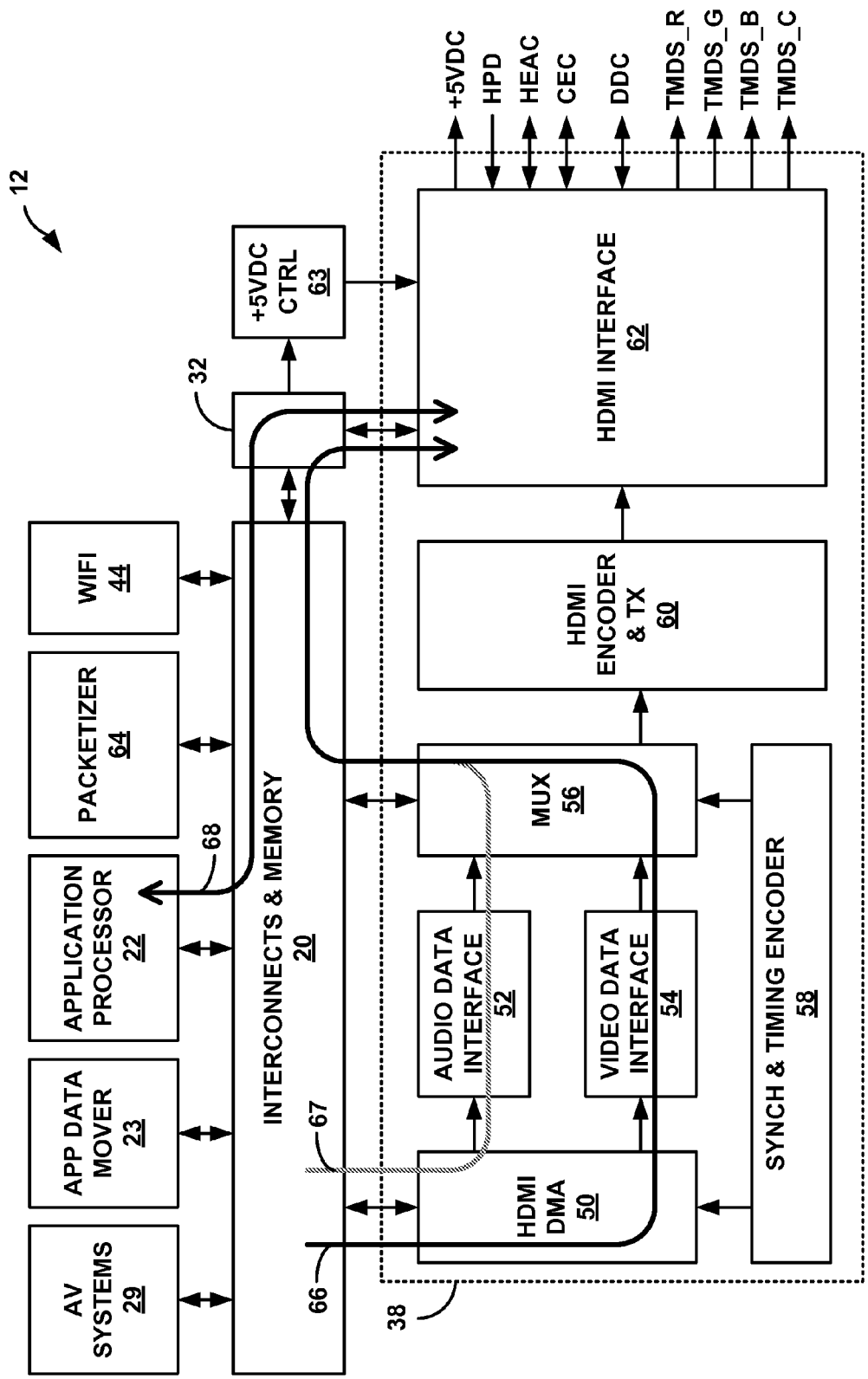
FIG. 3 is a block diagram illustrating an example HDMI transmission data path through the source device of the WD system.

FIG. 3 is a block diagram illustrating an example HDMI transmission data path 66, 67, 68 through source device 12 of WD system 10 from FIG. 1. The illustrated HDMI transmission data path 66, 67, 68 through source device 12 may be used in the case where source device 12 is directly connected to a sink device via a physical HDMI connection. The example of source device 12 illustrated in FIG. 3 presents a modified view of several of the same functional units described in detail with respect to FIG. 2. More specifically, FIG. 3 illustrates HDMI system 38 in greater detail.

As illustrated in FIG. 3, source device 12 includes interconnects and memory 20, AV systems 29, application data mover 23, application processor 22, WiFi system 44, peripheral interface 32, system 38, packetizer 64, and a 5 volt direct current (+5VDC) controller 63. Packetizer 64 is configured to packetize data for transmission over certain peripheral interfaces or connection interfaces, and to depacketize data received over certain peripheral interfaces or connection interfaces. Conventionally, HDMI-based data is not packetized for transmission over an HDMI connection. As can be seen in FIG. 3, packetizer 64 is not used in the HDMI transmission data path 66, 67, 68. The +5VDC controller 63 may provide 5 volts of DC power to HDMI system 38 for the +5VDC pin of HDMI interface 62.

In the example illustrated in FIG. 3, HDMI system 38 includes an HDMI direct memory access (DMA) unit 50, an audio data interface 52, a video data interface 54, a multiplexer (MUX) 56, a synchronization and timing encoder 58, an HDMI encoder and transmitter (TX) unit 60, and HDMI interface 62. HDMI interface 62 may include a plurality of physical connection pins, e.g., 19 pins, used to carry video an/or audio data channels and control data channels over a physical HDMI connection, i.e., a cable, to a sink device.

For purposes of clarity, only nine of the physical connection pins of HDMI interface 62 are illustrated in FIG. 3. Specifically, the example of HDMI interface 62 illustrated in FIG. 3 includes five physical connection pins used to transmit HDMI control and security data over the physical HDMI connection. As illustrated, HDMI interface 62 includes a +5VDC pin used to provide 5 volts of DC power to the physical HDMI connection, a hot plug detect (HPD) pin that receives a signal used to determine whether the sink device is connected to the physical HDMI connection, an HDMI Ethernet audio control (HEAC) pin used to transmit control information for audio and data applications at the sink device, a consumer electronics control (CEC) pin used to transmit control information to support command and control of the sink device, and a display data channel (DDC) pin used to transmit control information to determine audio and video formats accepted at the sink device.

In addition, the example of HDMI interface 62 illustrated in FIG. 3 includes four physical connection pins used to transmit HDMI frames in Transition Minimized Differential Signaling (TMDS) channels over the physical HDMI connection. In the illustrated example, HDMI interface 62 includes a red TMDS pin (TMDS_R) used to transmit HDMI frames for a red color component, a green TMDS pin (TMDS_G) used to transmit HDMI frames for a green color component, a blue TMDS pin (TMDS_B) used to transmit HDMI frames for a blue color component, and a clock TMDS in (TMDS_C) used to transmit a clock signal.

The HDMI transmission data path 66, 67, 68 through source device 12 includes HDMI video data path 66, HDMI audio data path 67 and HDMI control data path 68. Source device 12 processes HDMI video data and HDMI audio and auxiliary data using AV systems 29 and stores the processed HDMI data in interconnects and memory 20. In accordance with HDMI video data path 66, HDMI DMA unit 50 accesses the HDMI video data from interconnects and memory 20 and provides the HDMI video data to MUX 56 via video data interface 54. In accordance with HDMI audio data path 67, HDMI DMA unit 50 accesses the HDMI audio and auxiliary data from interconnects and memory 20 and provides the HDMI audio and auxiliary data to MUX 56 via audio data interface 52.

At MUX 56, the HDMI video data and the HDMI audio and auxiliary data are interleaved into HDMI frames for the different color components, R, G and B. Synchronization and timing encoder 58 may insert synchronization control signals, preambles, and guardbands into the interleaved HDMI data to ensure that the audio data and the video data are properly synchronized with each other for playback. An example frame format of the interleaved HDMI video and HDMI audio and auxiliary data is described in more detail below with respect to FIG. 7.

The HDMI frames may then be stored back to interconnects and memory 20 for later transmission or passed directly through interconnects and memory 20 to HDMI interface 62 via peripheral interface 32. HDMI interface 62 may then transmit the HDMI frames in HDMI TMDS channels over the physical HDMI connection to the sink device. For example, the HDMI frames for the red color component are transmitted in the TMDS_R channel, the HDMI frames for the green color component are transmitted in the TMDS_G channel, and the HDMI frames for the blue color component are transmitted in the TMDS_B channel.

Source device 12 also processes HDMI control and security data for the physical HDMI connection using application processor 22. In accordance with HDMI control data path 68, the HDMI control and security data may be stored in interconnects and memory 20 for later transmission or passed directly through interconnects and memory 20 to HDMI interface 62 via peripheral interface 32. HDMI interface 62 may then transmit the HDMI control and security data in HDMI non-TMDS channels over the physical HDMI connection to the sink device. For example, control information for audio and data applications at the sink device is transmitted in the HEAC channel, control information to support command and control of the sink device is transmitted in the CEC channel, and control information to determine audio and video formats accepted at the sink device is transmitted in the DDC channel.

Figure 4:
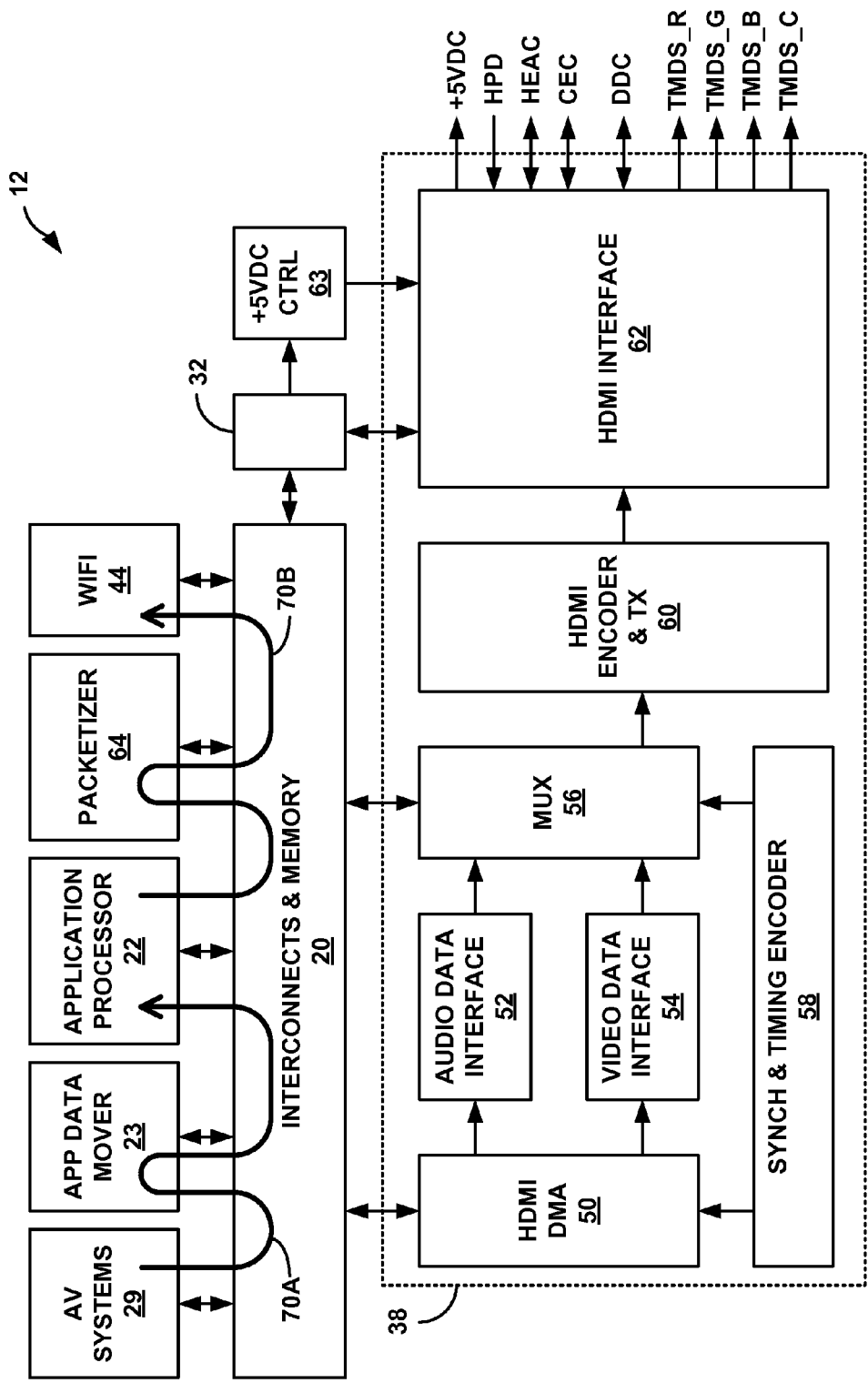
FIG. 4 is a block diagram illustrating an example WD transmission data path through the source device of the WD system.

FIG. 4 is a block diagram illustrating an example WD transmission data path 70A-70B (collectively "data path 70") through source device 12 of WD system 10 from FIG. 1. The illustrated WD transmission data path 70 through source device 12 may be used in the case where source device 12 is connected to a sink device via a wireless connection. The example of source device 12 illustrated in FIG. 4 presents the same functional units described in detail with respect to FIG. 3.

The WD transmission data path 70 through source device 12 includes a WD multimedia data path portion 70A, and a WD transport data path portion 70B. In accordance with WD multimedia data path portion 70A, source device 12 receives video data and audio data from AV systems 29 and stores the multimedia data in interconnects and memory 20. Application data mover 23 then moves the multimedia data from interconnects and memory 20 to application processor 22 for processing.

In accordance with WD transport data path portion 70B, the processed multimedia data is stored back in interconnects and memory 20. Packetizer 64 then retrieves the multimedia data from interconnects and memory 20 and packetizes the multimedia data for transmission over the wireless connection. As an example, packetizer 64 may encapsulate the multimedia data into packetized elementary streams (PES) in a transport stream format, e.g., MPEG-TS, identified by a packet identifier (PID). An example WD protocol stack that includes a packetized stream carrying elementary streams in packets within the transport stream format is described in more detail below with respect to FIG. 10. The packetized multimedia data may then be stored back to interconnects and memory 20 for later transmission or passed directly through interconnects and memory 20 to WiFi system 44. WiFi system 44 may then transmit the packetized multimedia data over the wireless connection to the sink device.

Figure 5:
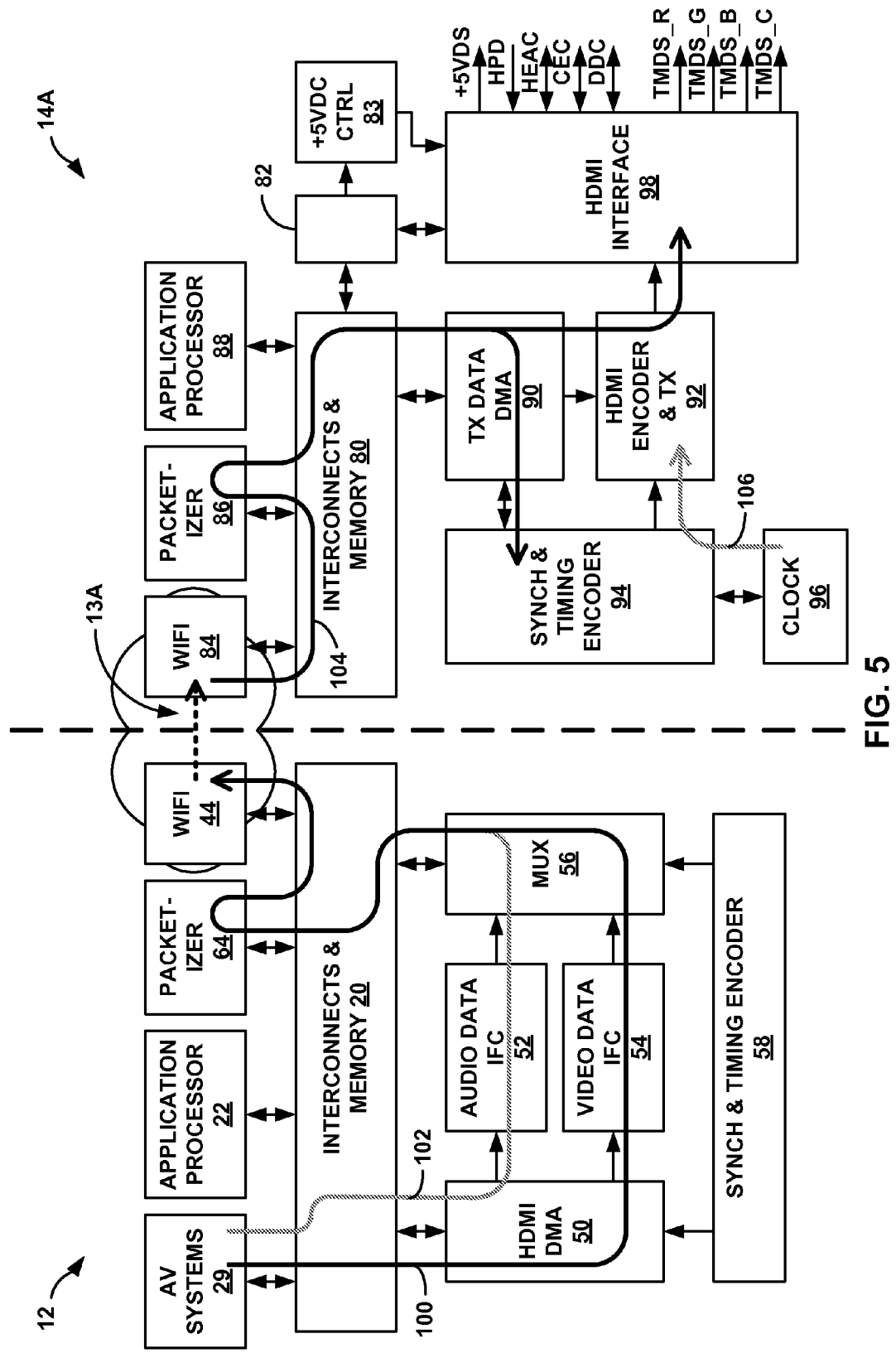
FIG. 5 is a block diagram illustrating an example data path for tunneling HDMI video and audio/auxiliary data over a wireless connection between the source device and a client device of the WD system, in accordance with techniques of this disclosure.

FIG. 5 is a block diagram illustrating an example data path 100, 102, 104, 106 for tunneling HDMI video and audio/auxiliary data over wireless connection 13A between source device 12 and client device 14A of WD system 10 from FIG. 1, in accordance with techniques of this disclosure. The example of source device 12 illustrated in FIG. 5 presents several of the same functional units for HDMI-based data, control, and security processing and WD transmission described in detail with respect to FIGS. 3 and 4.

The example of client device 14A illustrated in FIG. 5 presents functional units for WD transmission with source device 12 and HDMI transmission with an HDMI-capable sink device, e.g., sink device 16A from FIG. 1. As illustrated in FIG. 5, client device 14A includes interconnects and memory 80, peripheral interface 82, a 5 volt direct current (+5VDC) controller 83, WiFi system 84, packetizer 86, application processor 88, transmitter (TX) data direct memory access (DMA) unit 90, HDMI encoder and transmitter (TX) unit 92, synchronization and timing encoder 94, clock 96 and HDMI interface 98. The +5VDC controller 83 may provide 5 volts of DC power for the +5VDC pin of HDMI interface 98.

In the example illustrated in FIG. 5, HDMI interface 98 may include a plurality of physical connection pins, e.g., 19 pins, used to carry video and/or audio data channels and control data channels over a physical HDMI connection, i.e., a cable, to a sink device. For purposes of clarity, only nine of the physical connection pins are illustrated in FIG. 5. The example of HDMI interface 98 illustrated in FIG. 5 includes five physical connection pins used to transmit HDMI control and security data over the physical HDMI connection to the sink device, e.g., a +5VDC pin, a HPD pin, an HEAC pin, a CEC pin, and a DDC pin, which function as described above with respect to HDMI interface 62 of FIG. 3. In addition, the example of HDMI interface 98 illustrated in FIG. 5 includes four physical connection pins used to transmit HDMI frames in TMDS channels over the physical HDMI connection to the sink device, e.g., a TMDS_R pin, a TMDS_G pin, a TMDS_B pin, and a TMDS_C pin, which function as described above with respect to HDMI interface 62 of FIG. 3.

According to the disclosed techniques, source device 12 performs HDMI-based data, control, and security processing, but instead of transmitting the HDMI data over a physical HDMI connection via HDMI interface 62 (as described in FIG. 3), source device 12 encapsulates the HDMI data for transmission over wireless connection 13A via WiFi system 44 to client device 14A. Client device 14A then decapsulates the HDMI data, and transmits the HDMI data to the sink device over a physical HDMI connection via HDMI interface 98, without performing any processing of the HDMI data.

In accordance with HDMI video data path 100 and HDMI audio data path 102, source device 12 processes HDMI video data and HDMI audio and auxiliary data using AV systems 29. HDMI DMA unit 50 then accesses the HDMI video data and the HDMI audio and auxiliary data from interconnects and memory 20 and provides the HDMI video data and the HDMI audio and auxiliary data to MUX 56 via video data interface 54 and audio data interface 52, respectively. At MUX 56, the HDMI video data and the HDMI audio and auxiliary data are interleaved into HDMI frames for the different color components. Synchronization and timing encoder 58 may insert synchronization control signals, preambles, and guardbands into the interleaved HDMI data to ensure that the audio data and the video data are properly synchronized with each other for playback. The HDMI video data and the HDMI audio and auxiliary data processed by source device 12 may be associated with HDMI TMDS channels of a physical HDMI connection, e.g., physical HDMI connection 15A between client device 14A and sink device 16A.

According to the techniques of this disclosure, packetizer 64 of source device 12 then encapsulates the HDMI video data and the HDMI audio and auxiliary data into a transport stream format for transmission over wireless connection 13A between source device 12 and client device 14A. As an example, packetizer 64 may encapsulate the HDMI video data for each color component (e.g., each of the RGB color components) into video streams of the transport stream format associated with a PID for the respective video color component. Packetizer 64 may also encapsulate the HDMI audio and auxiliary data for each color component (e.g., each of the RGB color components) into audio streams of the transport stream format associated with a PID for the respective audio color component. Packetizer 64 may not include the synchronization control signals, preambles, and guardbands associated with the HDMI video data and the HDMI audio and auxiliary data in the video streams or the audio streams for transmission over wireless connection 13A. WiFi system 44 of source device 12 then transmits the encapsulated HDMI data over wireless connection 13A to client device 14A for transfer to the sink device via the physical HDMI connection.

According to the techniques of this disclosure, client device 14A may be a "dummy" client device that essentially only includes a wireless transceiver and an HDMI connector. Client device 14A may not be configured to perform HDMI-based processing, but instead merely acts as a wireless HDMI bridge to pass the HDMI data between source device 12 and a sink device, e.g., sink device 16A, to which client device 14A has a physical HDMI connection. WiFi system 84 of client device 14A receives encapsulated HDMI data in a transport stream format over wireless connection 13A from source device 12.

In accordance with HDMI multimedia data path 104, packetizer 86 retrieves the encapsulated HDMI data from memory 80 and generates HDMI data from the encapsulated HDMI data without performing any processing of the HDMI data. More specifically, packetizer 86 may generate HDMI video data by decapsulating HDMI video data for each color component (e.g., each of the RGB color components) from video streams of the transport stream format associated with a PID for the respective video color component. Packetizer 86 of client device 14A may generate HDMI audio and auxiliary data by decapsulating HDMI audio and auxiliary data for each color component (e.g., each of the RGB color components) from audio streams of the transport stream format associated with a PID for the respective audio color component.

In further accordance with HDMI multimedia data path 104, transmitter data DMA unit 90 then accesses the HDMI video data and HDMI audio and auxiliary data from memory 80 and provides the HDMI video data and the HDMI audio and auxiliary data to HDMI encoder and transmitter unit 92. Synchronization and timing encoder 94 may generate synchronization control signals, preambles, and guardbands associated with the HDMI video data and the HDMI audio and auxiliary data based on information received from clock 96 via timing data path 106. HDMI encoder and transmitter unit 92 may insert the synchronization control signals, preambles, and guardbands into the HDMI video data and the HDMI audio and auxiliary data in order to recreate the HDMI frames for the different color components.

HDMI interface 98 may then transmit the HDMI frames in HDMI TMDS channels over the physical HDMI connection to the sink device. For example, the HDMI frames for the red color component are transmitted in the TMDS_R channel, the HDMI frames for the green color component are transmitted in the TMDS_G channel, and the HDMI frames for the blue color component are transmitted in the TMDS_B channel.

Figure 6:
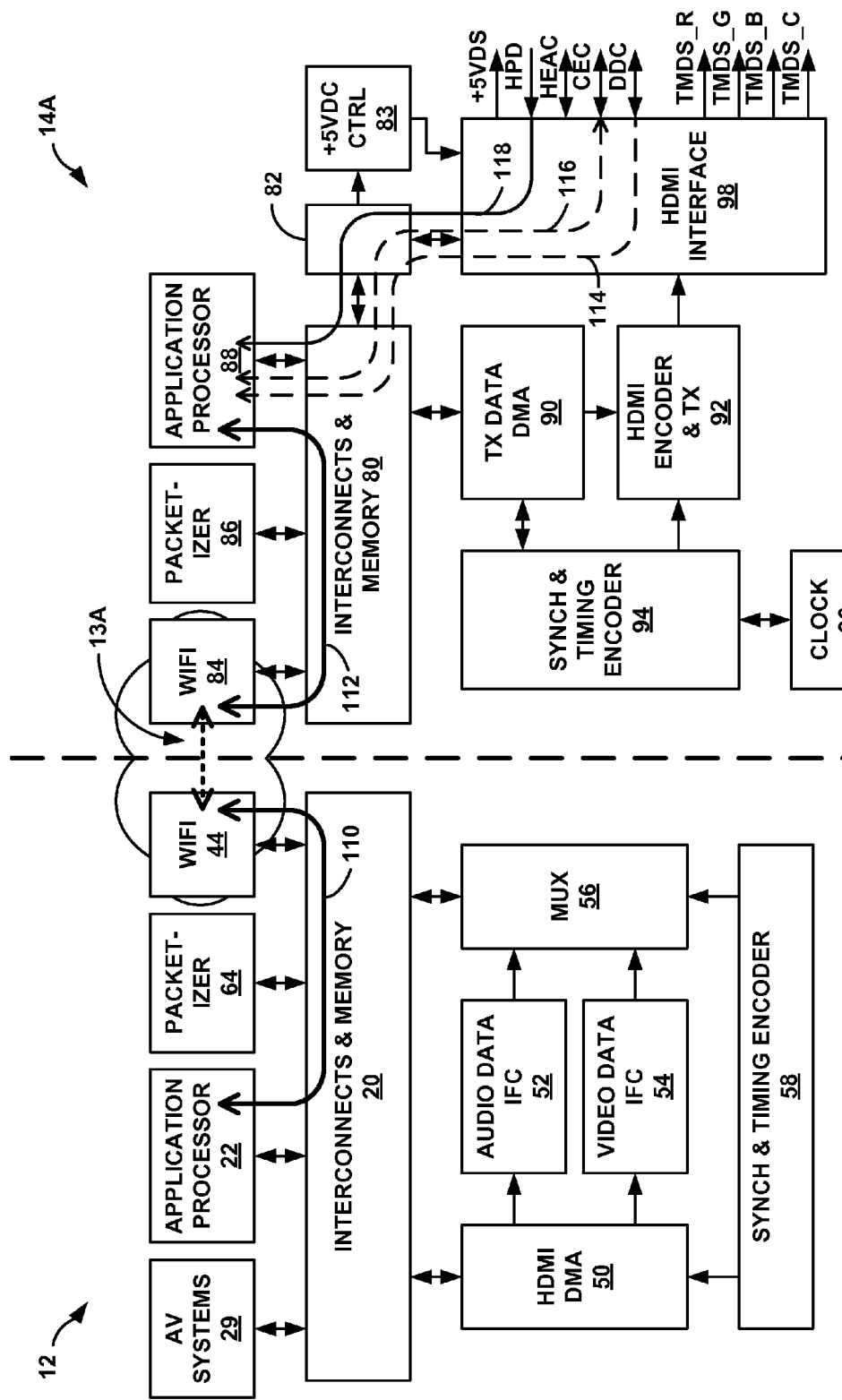
FIG. 6 is a block diagram illustrating an example data path for tunneling HDMI control and security data over a wireless connection between the source device and a client device of the WD system, in accordance with techniques of this disclosure.

FIG. 6 is a block diagram illustrating an example data path 110, 112, 114, 116, 118 for tunneling HDMI control and security data over wireless connection 13A between source device 12 and client device 14A of WD system 10 from FIG. 1, in accordance with techniques of this disclosure. The example of source device 12 illustrated in FIG. 6 presents the same functional units described in detail with respect to FIG. 5, and the example client device 14A illustrated in FIG. 6 presents the same functional units described in detail with respect to FIG. 5.

According to the disclosed techniques, source device 12 performs HDMI-based data, control, and security processing, but instead of transmitting the HDMI data over a physical HDMI connection via HDMI interface 62 (as described in FIG. 3), source device 12 encapsulates the HDMI data for transmission over wireless connection 13A via WiFi system 44 to client device 14A. Client device 14A then decapsulates the HDMI data, and transmits the HDMI data to the sink device over a physical HDMI connection via HDMI interface 98, without performing any processing of the HDMI data.

In accordance with HDMI control and security data path 110, source device 12 processes HDMI control and security data for the physical HDMI connection between client device 14A and the sink device using application processor 22. In this way, client device 14A does not need to perform any HDMI control and security processing, including HDCP processing, for its physical HDMI connection with the sink device. Application processor 22 of source device 12 encapsulates the HDMI control and security data into IP datagrams for transmission over the wireless connection 13A between source device 12 and client device 14A. WiFi system 44 of source device 12 then transmits the encapsulated HDMI data over wireless connection 13A to client device 14A for transfer to the sink device via the physical HDMI connection.

The HDMI control and security data processed by source device 12 may be associated with HDMI non-TMDS channels of a physical HDMI connection, e.g., physical HDMI connection 15A between client device 14A and sink device 16A. For example, source device 12 may process data associated with a DDC channel of the physical HDMI connection to determine audio and video formats accepted at the sink device, data associated with a CEC channel of the physical HDMI connection to support command and control of the sink device by source device 12, data associated with an HEAC channel of the physical HDMI connection to control audio and data applications of the sink device, and/or data associated with a HPD channel of the physical HDMI connection to determine at source device 12 whether the sink device is connected to client device 14A.

In some examples, WiFi system 44 of source device 12 may receive encapsulated HDMI control and security data in IP datagrams over wireless connection 13A from client device 14A, where the HDMI control and security data is associated with the sink device that has a physical HDMI connection with client device 14A. In accordance with HDMI control and security data path 110, application processor 22 of source device 12 may decapsulate the HDMI control and security data from the received IP datagrams, and process the HDMI control and security data. The HDMI control and security data associated with the sink device may indicate one or more of audio and video formats accepted at the sink device, user requests or interactions at the sink device, audio and data applications at the sink device, and whether the sink device is connected to client device 14A.

According to the techniques of this disclosure, client device 14A may be a "dummy" client device that essentially only includes a wireless transceiver and an HDMI connector. Client device 14A may not be configured to perform HDMI-based processing, but instead merely acts as a wireless HDMI bridge to pass the HDMI data between source device 12 and a sink device, e.g., sink device 16A, to which client device 14A has a physical HDMI connection. WiFi system 84 of client device 14A receives encapsulated HDMI control and security data in IP datagrams over wireless connection 13A from source device 12.

In accordance with HDMI control and security data path 112, application processor 88 of client device 14A retrieves the encapsulated HDMI control and security data from memory 80 and generates HDMI control and security data from the received encapsulated HDMI control and security data. More specifically, application processor 88 may generate HDMI control and security data by decapsulating HDMI control and security data from the IP datagrams without processing the HDMI control and security data.

HDMI interface 98 may then transmit the HDMI control and security data in HDMI non-TMDS channels (e.g., HPD, HEAC, CEC, and DDC) over the physical HDMI connection to the sink device. In accordance with CEC data path 116, application processor 88 provides the HDMI control and security data for the CEC channel of the physical HDMI connection to HDMI interface 98 via interconnects and memory 80 and peripheral interface 82. HDMI interface 98 may transmit data over the CEC channel to provide commands and controls from source device 12 to the sink device. In some cases, application processor 88 also provides the HDMI control and security data for the HEAC channel of the physical HDMI connection to HDMI interface 98 via interconnects and memory 80 and peripheral interface 82, and HDMI interface 98 may transmit data over the HEAC channel to provide control of audio and data applications from source device 12 to the sink device.

In addition, HDMI interface 98 of client device 14A may receive HDMI control and security data over physical HDMI connection 15A from the sink device. For example, HDMI interface 98 may receive data over the DDC channel that indicates which audio and video formats are accepted at the sink device. In accordance with DDC data path 114, HDMI interface 98 provides the HDMI control and security data for the DDC channel to application processor 88 via peripheral interface 82 and interconnects and memory 80. As another example, HDMI interface 98 may receive data over the CEC channel that indicates user requests or interactions at the sink device.

In accordance with CEC data path 116, HDMI interface 98 provides the HDMI control and security data for the CEC channel to application processor 88 via peripheral interface 82 and interconnects and memory 80. In some cases, HDMI interface 98 may receive data over the HEAC channel and provide the data to application processor 88. As another example, HDMI interface 98 may receive data over the HPD pin that indicates whether the sink device is connected to client device 14A. In accordance with HPD data path 118, HDMI interface 98 provides the HDMI control and security data for the HPD pin to application processor 88 via peripheral interface 82 and interconnects and memory 80.

In accordance with HDMI control and security data path 112, application processor 88 of client device 14A may encapsulate the received HDMI control and security data into IP datagrams for transmission over wireless connection 13A without processing the HDMI control and security data. WiFi system 84 of client device 14A then transmits the encapsulated HDMI control and security data over wireless connection 13A to source device 12 for processing of the HDMI control and security data.

Figures 7, 8:
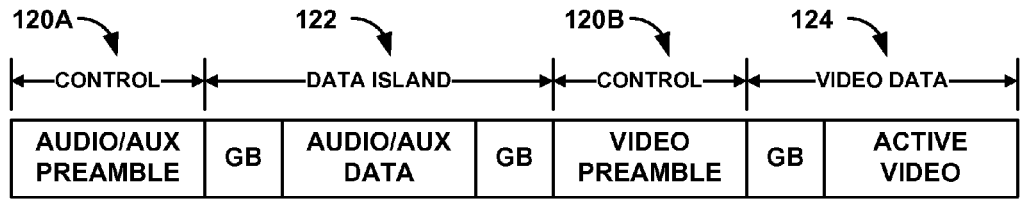
FIG. 7 is a conceptual diagram illustrating an example frame format of interleaved HDMI video and HDMI audio and auxiliary data.
FIG. 8 is a table illustrating an example data mapping for tunneling HDMI data over a wireless connection, in accordance with techniques of this disclosure.

FIG. 7 is a conceptual diagram illustrating an example frame format of interleaved HDMI video and HDMI audio and auxiliary data. In general, an HDMI-capable source device, e.g., source device 12, prepares HDMI data for transmission over a physical HDMI connection by multiplexing HDMI video data and HDMI audio and auxiliary data into HDMI frames for different color components. In some examples, the HDMI frames may comprise RGB (red, green, blue) video frames. The HDMI-capable source device then uses TMDS for transmission of the HDMI frames over the physical HDMI connection to a sink device.

In the example illustrated in FIG. 7, the HDMI frame format includes a first control period 120A, a data island period 122, a second control period 120B, and a video data period 124. First and second control periods 120A-120B (collectively "control periods 120") carry data preambles. For example, first control period 120A carries an audio and auxiliary data preamble, and second control period 120B carries a video data preamble. Data island period 122 carries the HDMI audio and auxiliary data and one or more guardbands (GBs). Video data period 124 carries active HDMI video data and at least one guardband (GB).

FIG. 8 is a table 130 illustrating an example data mapping for tunneling HDMI data over a wireless connection, in accordance with techniques of this disclosure. Table 130 provides data mapping for both HDMI frames 132 associated with TMDS channels of a physical HDMI connection and HDMI control and security data 134 associated with non-TMDS channels of the physical HDMI connection into a transport stream format for tunneling over WiFi, e.g., according to the Miracast™ standard.

According to the techniques of this disclosure, source device 12 encapsulates the HDMI data for transmission over the wireless connection. For example, source device 12 encapsulates the HDMI video data and the HDMI audio and auxiliary data interleaved in HDMI frames 132 into a transport stream format, e.g., MPEG-TS. Source device 12 may encapsulate the HDMI video data for each color component (e.g., each of the RGB color components) into video streams of the transport stream format associated with a PID for the respective video color component. As illustrated in table 130, the HDMI video data carried in video data period 124 for each of the color components may be encapsulated into video elementary streams of the transport stream format identified by PID_R, PID_G and PID_B. The at least one guardband carried in video data period 124 may not be included in the video elementary streams.

Source device 12 may also encapsulate the HDMI audio and auxiliary data for each color component (e.g., each of the RGB color components) into audio streams of the transport stream format associated with a PID for the respective audio color component. As further illustrated in table 130, the HDMI audio and auxiliary data carried in data island period 122 for each of the color components may be encapsulated into audio elementary streams of the transport stream format identified by PID_ADR, PID_ADG and PID_ADB. The one or more guardbands carried in video data period 124 and any associated synchronization control signals (e.g., VSYNC and/or HSYNC) are not included in the audio elementary streams.

Figure 10:
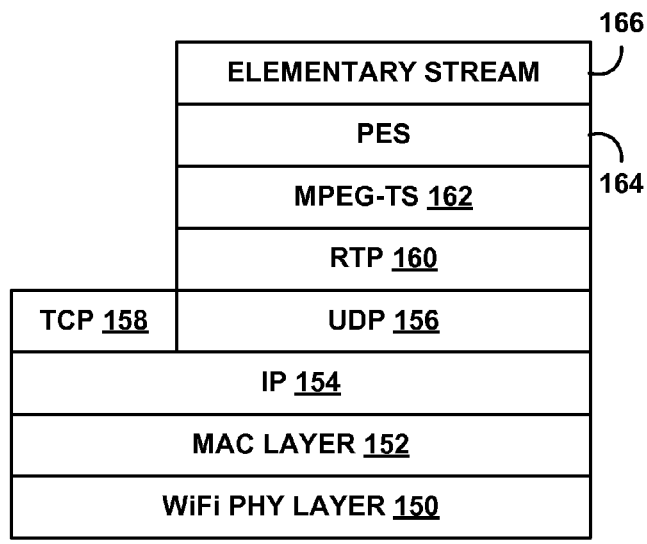
FIG. 10 is a conceptual diagram illustrating an example WD protocol stack in which HDMI data is tunneled in accordance with techniques of this disclosure.

Additionally, as illustrated in table 130, the data preambles carried in control periods 120 and any associated synchronization control signals (e.g., VSYNC and/or HSYNC) are not included in either the video elementary streams or the audio elementary streams. Instead, synchronization and liming circuitry at a client device or a sink device may regenerate and reinsert the synchronization control signals, preambles, and guardbands in the HDMI video data and HDMI audio and auxiliary data. The packetized elementary streams (PES) in the transport stream format, e.g., MPEG-TS, are then transmitted over RTP/UDP/IP in the WD protocol stack, e.g., according to the Miracast™ standard, as illustrated in FIG. 10.

Conventionally, the Miracast™ standard and other wireless network technologies use the transport stream format to carry compressed video data. In accordance with the described techniques, the elementary streams or containers in the transport stream format may be specifically defined to carry the uncompressed HDMI video data and compressed or uncompressed HDMI audio data over a wireless connection.

Source device 12 also encapsulates the HDMI control and security data 134 into IP datagrams for transmission over TCP/IP. As illustrated in table 130, each of the control information included in the DDC channel, the command and control information included in the CEC channel, the IP datagrams included in the HEAC channel, and the status information included in the HPD channel are encapsulated into IP datagrams. The IP datagrams are then transmitted over TCP/IP in the WD protocol stack, e.g., according to the Miracast™ standard, as illustrated in FIG. 10.

Figure 9:
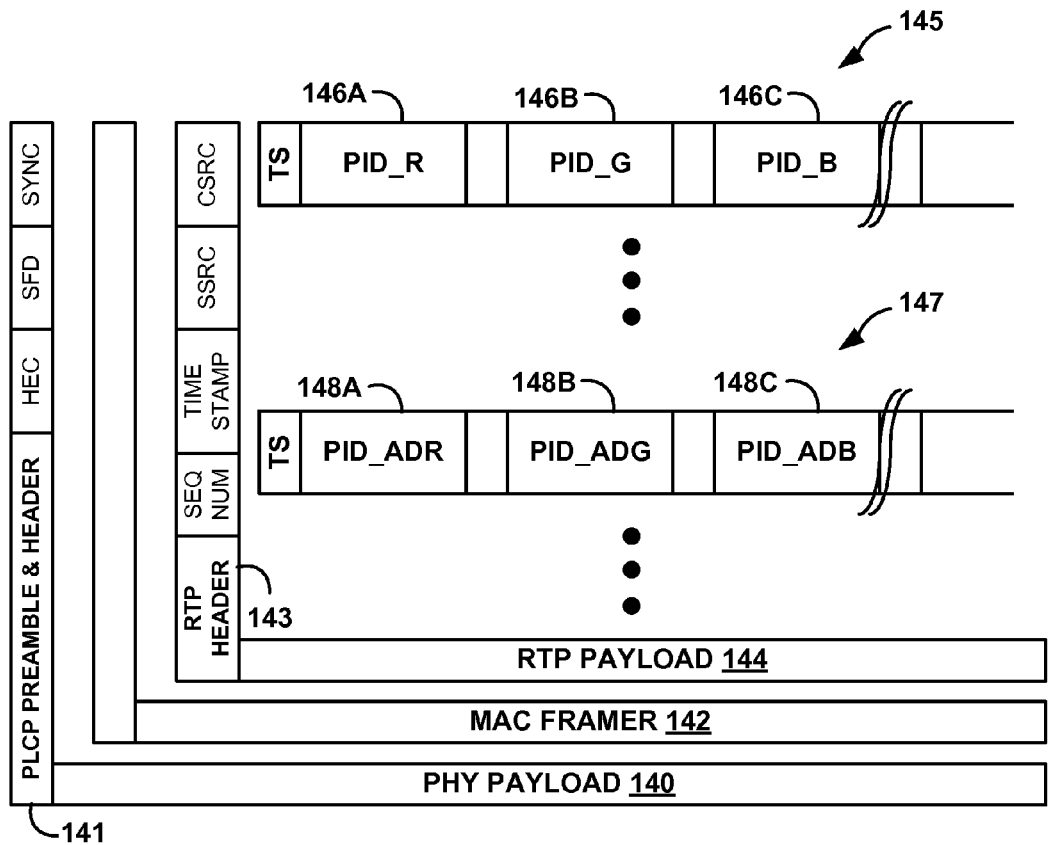
FIG. 9 is a conceptual diagram illustrating an example transport stream format in which HDMI video data and HDMI audio and auxiliary data is tunneled in accordance with techniques of this disclosure.

FIG. 9 is a conceptual diagram illustrating an example transport stream format in which HDMI video data and HDMI audio and auxiliary data is tunneled in accordance with techniques of this disclosure. As illustrated in FIG. 9, a video packetized elementary stream (PES) 145 and an audio PES 147 in the transport stream format are transmitted in a Real-time Transport Protocol (RTP) packet, which is encapsulated in a media access control (MAC) framer 142 and a physical (PHY) packet.

The PHY packet includes a PHY payload 140 and a Physical Layer Convergence Procedure (PLCP) preamble and header 141. PLCP preamble and header 141 includes a header error check (HEC), a start frame delimiter (SFD) and a synchronization bit (SYNC). The RTP packet includes a RTP payload 144 and a RTP header 143. RTP header 143 includes a sequence number (SEQ NUM) that increments by one for each RTP packet sent, a time stamp, a synchronization source ID (SSRC) that uniquely identifies a source of the stream included in RTP packet, and contributing source IDs (CSRC) that uniquely identifies contributors to the stream included in RTP packet from multiple sources.

According to the techniques of this disclosure, RTP payload 144 carries video PES 145 configured to tunnel HDMI video data and audio PES 147 configured to tunnel HDMI audio and auxiliary data. In other examples, RTP payload 144 may include more than one video PES and/or more than one audio PES. In the example illustrated in FIG. 9, video PES 145 includes a transport stream header (TS), a video elementary stream for the red color component identified by PID_R 146A, a video elementary stream for the green color component identified by PID_G 146B, and a video elementary stream for the blue color component identified by PID_B 146C. In some examples, video PES 145 may include multiple video elementary streams for each of the color components identified using the PID for the respective color component.

Furthermore, in the example illustrated in FIG. 9, audio PES 147 includes a transport stream header (TS), an audio elementary stream for the red color component identified by PID_ADR 148A, an audio elementary stream for the green color component identified by PID_ADG 148B, and an audio elementary stream for the blue color component identified by PID_ADB 148C. In some examples, audio PES 147 may include multiple audio elementary streams for each of the color components identified using the PID for the respective color component.

FIG. 10 is a conceptual diagram illustrating an example WD protocol stack in which HDMI data is tunneled in accordance with techniques of this disclosure. The illustrated WD protocol stack may be in accordance with the Miracast™ standard. In general, the example illustrated in FIG. 10 presents a simplified version of the WD protocol stack for ease of illustration and should not be viewed as limited to the illustrated configuration.

The illustrated WD protocol stack includes a WiFi physical (PHY) layer 150, a media access control (MAC) layer 152, an Internet Protocol (IP) layer 154, a Transmission Control Protocol) layer 158, User Datagram Protocol (UDP) layer 156, a. Real-time Transport Protocol (RTP) layer 160, a MPEG transport stream (MPEG-TS) layer 162, a packetized elementary stream (PES) layer 164, and an elementary stream layer 166. In other examples, the WD protocol stack may include more or less layers in a different arrangement.

According to the disclosed techniques, HDMI video data and HDMI audio and auxiliary data may be encapsulated into video and audio elementary streams for the different color components at elementary stream layer 166. The elementary streams are then packetized in PES layer 164 and carried in packets within MPEG-TS layer 162. As illustrated in FIG. 10, the encapsulated data in the MPEG-TS layer 162 is transmitted over RTP layer 160, UDP layer 156, and IP layer 154. Furthermore, in accordance with the disclosed techniques, HDMI control and security data may be encapsulated into IP datagrams and transmitted over TCP layer 158 and IP layer 154.

The disclosed techniques may result in one or more benefits. For example, source device 12 performs all the required control and security processing (e.g., HPD, DDC/EDID, CEC, HEAC and MCP). In this way, the design of client device 14A may be simplified to merely an HDMI bridge between source device 12 and sink device 16A. The simplified design of client device 14A may reduce the bill of materials (BOM) cost, reduce the product development time, avoid HDCP licensing fees, and ease manufacturing.

As another example, bringing CECs from distributed HDMI-connected islands (e.g., two or more HDMI-enabled client devices 14 or sink devices 16) to a single source device (e.g., source device 12) creates a unified control plane and enables a ubiquitous service discovery framework. The unified control plane allows source device 12 to use and control other HDMI-enabled devices in the platform regardless of whether its connection to the other HDMI-enabled devices is wired or wireless.

Furthermore, delivering HDMI data over a wireless connection, e.g., according to the Miracast™ standard, via a WiFi network or a WiFi Direct connection, avoids video codec latency and eliminates potential prolonged video degradation in poor channel conditions because source device 12 preserves the media interleaving specification. The disclosed techniques also minimize complexity of synchronizing multiple types of media (e.g., Lipsync, 3D/MV video, etc.). In addition, tunneling HDMI data over a wireless connection, e.g., according to the Miracast™ standard, via a WiFi network or WiFi Direct connection, provides an economically viable alternative for delivering high fidelity audio and/or video data over long distances with better error resiliency than standard HDMI coding due to the use of WiFi repeat and multi-rate retransmission.

Figure 11:
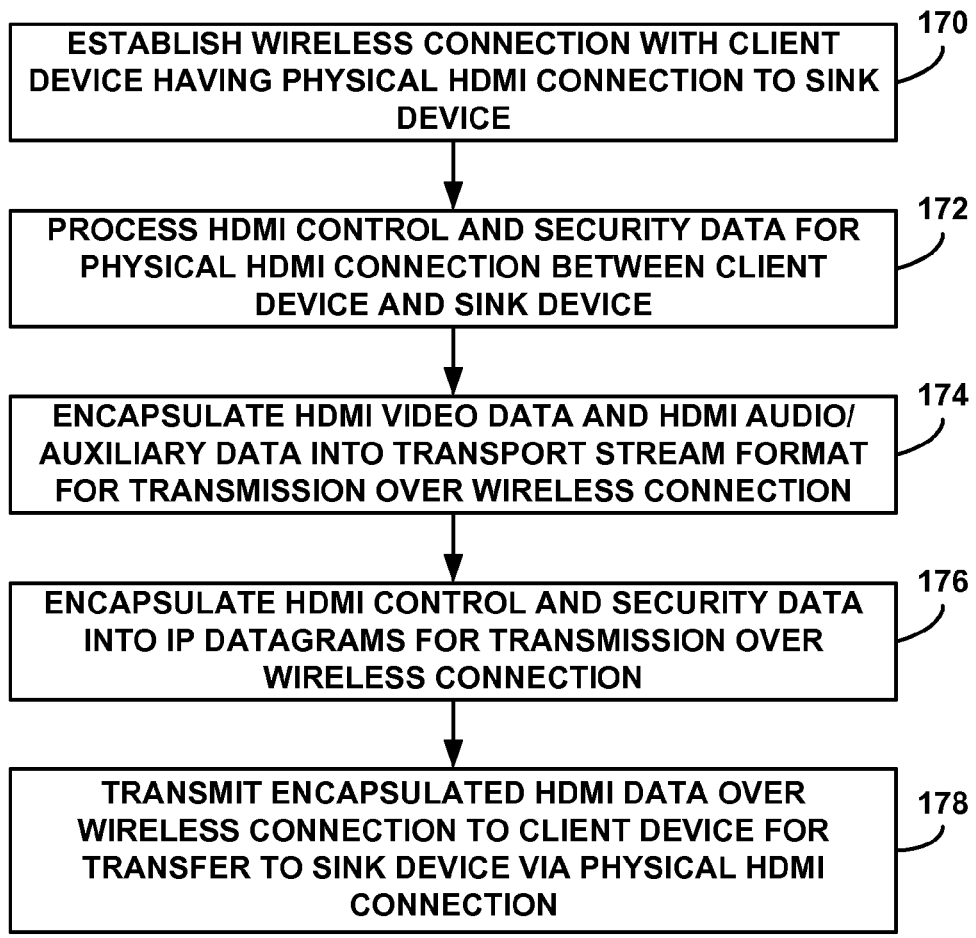
FIG. 11 is a flowchart illustrating an example operation of a source device in a WD system processing HDMI data for transmission over a wireless connection, in accordance with techniques of this disclosure.

FIG. 11 is a flowchart illustrating an example operation of a source device in a WD system processing HDMI data for transmission over a wireless connection, in accordance with techniques of this disclosure. The operation illustrated in FIG. 11 is described with respect to source device 12 from FIGS. 5 and 6.

Source device 12 establishes a wireless connection 13A, e.g., for wireless display according to the Miracast™ standard, with at least one client device 14A having a physical HDMI connection 15A to a sink device 16A (170). According to the techniques of this disclosure, source device 12 may operate as an HDMI controller and perform HDMI-based data, control, and security processing for HDMI connectivity with sink device 16A via client device 14A. In this case, client device 14A may be a "dummy" client device that essentially only includes a wireless transceiver and an HDMI connector, and merely acts as a wireless HDMI bridge to pass the HDMI data between source device 12 and sink device 16A.

Source device 12 processes HDMI video data and HDMI audio and auxiliary data using AV systems 29. As described above with respect to FIG. 7, the HDMI video data and the HDMI audio and auxiliary data may be interleaved into HDMI frames for the different color components. The HDMI video data and the HDMI audio and auxiliary data processed by source device 12 may be associated with HDMI TMDS channels of the physical HDMI connection 15A between client device 14A and sink device 16A.

According to techniques of this disclosure, source device 12 also processes HDMI control and security data for the physical HDMI connection 15A between client device 14A and sink device 16A (172). Source device 12 processes HDMI control and security data using application processor 22. In this way, client device 14A does not need to perform any HDMI control and security processing, including HDCP processing.

The HDMI control and security data processed by source device 12 may be associated with HDMI non-TMDS channels of the physical HDMI connection 15A between client device 14A and sink device 16A. As one example of source device 12 processing HDMI control and security data, application processor 22 of source device 12 may process data associated with a DDC of the physical HDMI connection 15A between client device 14A and sink device 16A to determine audio and video formats accepted at sink device 16A.

As another example, application processor 22 may process data associated with a CEC channel of the physical HDMI connection 15A between client device 14A and sink device 16A to support command and control of sink device 16A by source device 12. As another example, application processor 22 may process data associated with an HEAC channel of the physical HDMI connection 15A between client device 14A and sink device 16A to control audio and data applications of sink device 16A. As a further example, application processor 22 may process data associated with a HPD channel of the physical HDMI connection 15A between client device 14A and sink device 16A to determine at source device 12 whether sink device 16A is connected to client device 14A.

According to the techniques of this disclosure, source device 12 then encapsulates the HDMI data for transmission over the wireless connection. The HDMI data may include the HDMI video data, the HDMI audio and auxiliary data, and the HDMI control and security data. More specifically, packetizer 64 of source device 12 encapsulates the HDMI video data and the HDMI audio and auxiliary data into a transport stream format for transmission over wireless connection 13A between source device 12 and client device 14A (174). Application processor 22 of source device 12 encapsulates the HDMI control and security data into IP datagrams for transmission over the wireless connection 13A between source device 12 and client device 14A (176).

As an example, packetizer 64 may encapsulate the HDMI video data for each color component (e.g., each of the RGB color components) into video streams of the transport stream format associated with a PID for the respective video color component. Packetizer 64 may also encapsulate the HDMI audio and auxiliary data for each color component (e.g., each of the RGB color components) into audio streams of the transport stream format associated with a PID for the respective audio color component. As described above with respect to FIGS. 8 and 9, the video data may be encapsulated into video elementary streams identified by PID_R, PID_G and PID_B, and the audio and auxiliary data may be encapsulated into audio elementary streams identified by PID_ADR, PID_ADG and PID_ADB. In addition, as described above with respect FIG. 8, packetizer 64 may not include synchronization control signals, preambles, and guardbands associated with the HDMI video data and the HDMI audio and auxiliary data in the video streams or the audio streams for transmission over wireless connection 13A.

WiFi system 44 of source device 12 then transmits the encapsulated HDMI data over wireless connection 13A to client device 14A for transfer to sink device 16A via the physical HDMI connection 15A (178). In some examples, WiFi system 44 of source device 12 may receive encapsulated HDMI control and security data in IP datagrams over wireless connection 13A from client device 14A, where the HDMI control and security data is associated with sink device 16A. In this example, source device 12 may decapsulate the HDMI control and security data from the received IP datagrams, and process the HDMI control and security data. The HDMI control and security data associated with sink device 16A may indicate one or more of: audio and video formats accepted at sink device 16A, user requests or interactions at sink device 16A, audio and data applications at sink device 16A, and whether sink device 16A is connected to client device 14A.

Figure 12:
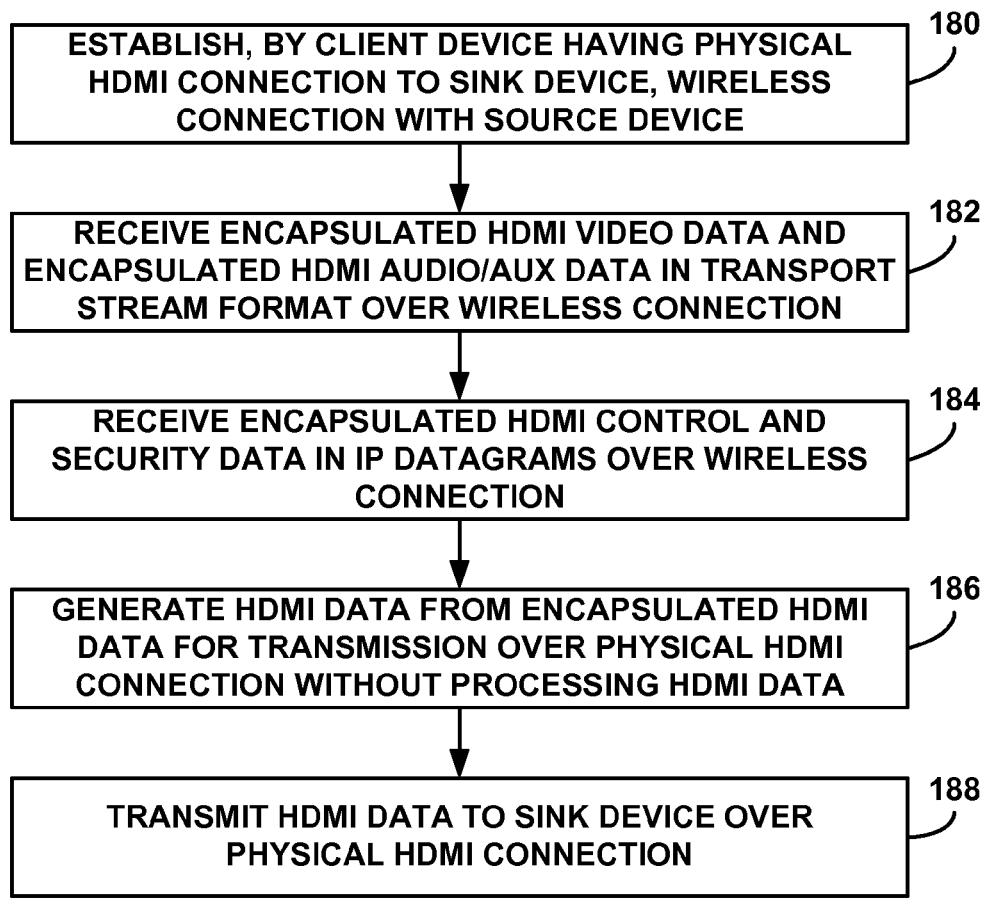
FIG. 12 is a flowchart illustrating an example operation of a client device in a WD system receiving encapsulated HDMI data over a wireless connection from a source device and transmitting HDMI data over a physical HDMI connection to a sink device, in accordance with techniques of this disclosure.

FIG. 12 is a flowchart illustrating an example operation of a client device in a WD system receiving encapsulated HDMI data over a wireless connection from a source device and transmitting HDMI data over a physical HDMI connection to a sink device, in accordance with techniques of this disclosure. The operation illustrated in FIG. 12 is described with respect to client device 14A from FIGS. 5 and 6.

Client device 14A having a physical HDMI connection 15A to a sink device 16A establishes a wireless connection 13A, e.g., for wireless display according to the Miracast™ standard, with source device 12 (180). According to the techniques of this disclosure, client device 14A may be a "dummy" client device that essentially only includes a wireless transceiver and an HDMI connector. Client device 14A may not be configured to perform HDMI-based processing, but instead merely acts as a wireless HDMI bridge to pass the HDMI data between source device 12 and sink device 16A.

Client device 14A receives encapsulated HDMI data over wireless connection 13A from source device 12. More specifically, WiFi system 84 of client device 14A receives encapsulated HDMI video data and encapsulated HDMI audio and auxiliary data in a transport stream format over wireless connection 13A from source device 12 (182). WiFi system 84 of client device 14A also receives encapsulated HDMI control and security data in IP datagrams over wireless connection 13A from source device 12 (184).

Client device 14A then generates HDMI data from the received encapsulated HDMI data for transmission over physical HDMI connection 15A without performing any processing of the HDMI data (186). As an example, packetizer 86 of client device 14A may generate HDMI video data by decapsulating HDMI video data for each color component (e.g., each of the RGB color components) from video streams of the transport stream format associated with a PID for the respective video color component. Packetizer 86 of client device 14A may generate HDMI audio and auxiliary data by decapsulating HDMI audio and auxiliary data for each color component (e.g., each of the RGB color components) from audio streams of the transport stream format associated with a PID for the respective audio color component. In addition, HDMI encoder and transmitter unit 92 of client device 14A may insert synchronization control signals, preambles, and guardbands into the HDMI video data and the HDMI audio and auxiliary data in order to recreate the HDMI frames for the different color components, described above with respect to FIG. 7. As another example, application processor 88 of client device 14A may generate HDMI control and security data by decapsulating HDMI control and security data from the IP datagrams without processing the HDMI control and security data.

HDMI interface 98 of client device 14A then transmits the HDMI data to sink device 16A over physical HDMI connection 15A (188). HDMI interface 98 transmits the HDMI video data and the HDMI audio and auxiliary data to sink device 16A over HDMI TMDS channels of physical HDMI connection 15A (e.g., TMDS_R, TMDS_G, TMDS_B, and TMDS_C). HDMI interface 98 transmits the HDMI control and security data to sink device 16A over HDMI non-TMDS channels of physical HDMI connection 15A (e.g., HPD, HEAC, CEC, and DDC). For example, HDMI interface 98 may transmit data over a DDC to request for source device 12 what audio and video formats are accepted at sink device 16A. As another example, HDMI interface 98 may transmit data over a CEC channel to provide commands and controls from source device 12 to sink device 16A. As a further example, HDMI interface 98 may transmit data over an HEAC channel to provide control of audio and data applications from source device 12 to sink device 16A.

In addition, HDMI interface 98 of client device 14A may receive HDMI control and security data over physical HDMI connection 15A from sink device 16A. Application processor 88 of client device 14A may then encapsulate the received HDMI control and security data into IP datagrams for transmission over wireless connection 13A without processing the HDMI control and security data. WiFi system 84 of client device 14A then transmits the encapsulated HDMI control and security data over wireless connection 13A to source device 12 for processing of the HDMI control and security data.

HDMI interface 98 may receive the HDMI control and security data associated with sink device 16A data over one or more of a DDC, CEC channel, an HEAC channel, or a HPD channel of physical HDMI connection 15A. The HDMI control and security data associated with sink device 16A may indicate one or more of: audio and video formats accepted at sink device 16A, user requests or interactions at sink device 16A, audio and data applications at sink device 16A, and whether sink device 16A is connected to client device 14A.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method of processing data comprising:
   establishing, by a source device, a wireless connection with at least one client device having a physical high definition multimedia interface (HDMI) connection to a sink device;
   processing, by the source device, HDMI control and security data for the physical HDMI connection between the client device and the sink device;
   encapsulating, by the source device, HDMI data for transmission over the wireless connection, the HDMI data including the HDMI control and security data, HDMI video data, and HDMI audio and auxiliary data, wherein encapsulating the HDMI data comprises:
      encapsulating the HDMI video data for each of a plurality of color components into video streams of a first transport stream having a transport stream format,
      encapsulating the HDMI audio and auxiliary data for each of the plurality of color components into audio streams of a second transport stream having the transport stream format, wherein the second transport stream is separate from the first transport stream, and
      encapsulating only the HDMI control and security data into Internet Protocol (IP) datagrams, wherein the IP datagrams are separate from the first transport stream and the second transport stream; and
   transmitting, by the source device, the encapsulated HDMI data over the wireless connection to the client device for transfer to the sink device via the physical HDMI connection.

2. The method of claim 1, wherein the video streams of the first transport format are each associated with a packet identifier (PID) for the respective video color component, and the audio streams of the second transport stream are each associated with a PID for the respective audio color component, and wherein synchronization control signals, preambles, and guardbands included in the HDMI video data and the HDMI audio and auxiliary data are not included in the video streams or the audio streams.

3. The method of claim 1, wherein the HDMI video data and the HDMI audio and auxiliary data are associated with HDMI transition minimized differential signaling (TMDS) channels of the physical HDMI connection between the client device and the sink device.

4. The method of claim 1, further comprising receiving, by the source device, encapsulated HDMI control and security data over the wireless connection from the client device, wherein the encapsulated HDMI control and security data includes HDMI control and security data associated with the sink device.

5. The method of claim 1, wherein processing the HDMI control and security data for the physical HDMI connection between the client device and the sink device comprises at least one of:
   processing data associated with a display data channel (DDC) of the physical HDMI connection between the client device and the sink device to determine audio and video formats accepted at the sink device;
   processing data associated with a consumer electronics control (CEC) channel of the physical HDMI connection between the client device and the sink device to support command and control of the sink device;
   processing data associated with an HDMI Ethernet audio control (HEAC) channel of the physical HDMI connection between the client device and the sink device to control audio and data applications at the sink device; or
   processing data associated with a hot plug detect (HPD) channel of the physical HDMI connection between the client device and the sink device to determine whether the sink device is connected to the client device.

6. A source device for processing data, the source device comprising:
   a memory; and
   one or more processors in communication with the memory and configured to:
      establish a wireless connection with at least one client device having a physical high definition multimedia interface (HDMI) connection to a sink device;
      process HDMI control and security data for the physical HDMI connection between the client device and the sink device;
      encapsulate HDMI data for transmission over the wireless connection, the HDMI data including the HDMI control and security data, HDMI video data, and HDMI audio and auxiliary data, wherein, to encapsulate the HDMI data, the one or more processors are configured to:
         encapsulate the HDMI video data for each of a plurality of color components into video streams of a first transport stream having a transport stream format,
         encapsulate the HDMI audio and auxiliary data for each of the plurality of color components into audio streams of a second transport stream having the transport stream format, wherein the second transport stream is separate from the first transport stream, and
         encapsulate only the HDMI control and security data into Internet Protocol (IP) datagrams, wherein the IP datagrams are separate from the first transport stream and the second transport stream; and transmit the encapsulated HDMI data over the wireless connection to the client device for transfer to the sink device via the physical HDMI connection.

7. The source device of claim 6, wherein the video streams of the first transport stream are each associated with a packet identifier (PID) for the respective video color component, and the audio streams of the second transport stream are each associated with a PID for the respective audio color component, and wherein synchronization control signals, preambles, and guardbands included in the HDMI video data and the HDMI audio and auxiliary data are not included in the video streams or the audio streams.

8. The source device of claim 6, wherein the HDMI video data and the HDMI audio and auxiliary data are associated with HDMI transition minimized differential signaling (TMDS) channels of the physical HDMI connection between the client device and the sink device.

9. The source device of claim 6, wherein the one or more processors are configured to receive encapsulated HDMI control and security data over the wireless connection from the client device, wherein the encapsulated HDMI control and security data includes HDMI control and security data associated with the sink device.

10. The source device of claim 6, wherein, to process the HDMI control and security data, the one or more processors are configured to at least one of:
process data associated with a display data channel (DDC) of the physical HDMI connection between the client device and the sink device to determine audio and video formats accepted at the sink device;
process data associated with a consumer electronics control (CEC) channel of the physical HDMI connection between the client device and the sink device to support command and control of the sink device;
process data associated with an HDMI Ethernet audio control (HEAC) channel of the physical HDMI connection between the client device and the sink device to control audio and data applications at the sink device; or
process data associated with a hot plug detect (HPD) channel of the physical HDMI connection between the client device and the sink device to determine whether the sink device is connected to the client device.

11. The source device of claim 6, wherein the source device comprises at least one of:
an integrated circuit;
a microprocessor; or
a wireless communication device.

12. A method of transmitting data comprising:
establishing, by a client device having a physical high definition multimedia interface (HDMI) connection to a sink device, a wireless connection with a source device;
receiving, by the client device, encapsulated HDMI data over the wireless connection from the source device, the encapsulated HDMI data including encapsulated HDMI video data in a first transport stream having a transport stream format and encapsulated HDMI audio and auxiliary data in a second transport stream having the transport stream format, wherein the second transport stream is separate from the first transport stream, and encapsulated HDMI control and security data in Internet Protocol (IP) datagrams, wherein the IP datagrams are separate from the first transport stream and the second transport stream;

generating, by the client device from the encapsulated HDMI data, HDMI data for transmission over the physical HDMI connection without performing any processing of the HDMI data, wherein generating the HDMI data comprises:
decapsulating HDMI video data for each of a plurality of color components from video streams of the first transport stream,
decapsulating HDMI audio and auxiliary data for each of the color components from audio streams of the second transport stream, and
inserting synchronization control signals, preambles, and guardbands into the HDMI video data and the HDMI audio and auxiliary data; and
transmitting, by the client device, the HDMI data to the sink device over the physical HDMI connection.

13. The method of claim 12, wherein the video streams of the first transport stream are each associated with a packet identifier (PID) for the respective video color component, and the audio streams of the second transport stream are each associated with a PID for the respective audio color component.

14. The method of claim 12, wherein transmitting the HDMI data comprises transmitting the HDMI video data and the HDMI audio and auxiliary data to the sink device over HDMI transition minimized differential signaling (TMDS) channels of the physical HDMI connection.

15. The method of claim 12, wherein generating the HDMI data for transmission over the physical HDMI connection comprises decapsulating HDMI control and security data from the IP datagrams without processing the HDMI control and security data.

16. The method of claim 15, wherein transmitting the HDMI data comprises transmitting the HDMI control and security data to the sink device over at least one of a display data channel (DDC), a consumer electronics control (CEC) channel, or an HDMI Ethernet audio control (HEAC) channel of the physical HDMI connection.

17. The method of claim 12, further comprising:
receiving, by the client device, HDMI control and security data over the physical HDMI connection with the sink device;
encapsulating, by the client device, the HDMI control and security data into Internet Protocol (IP) datagrams for transmission over the wireless connection without processing the HDMI control and security data; and
transmitting, by the client device, the encapsulated HDMI control and security data over the wireless connection to the source device.

18. The method of claim 17, wherein receiving the HDMI control and security data comprises receiving the HDMI control and security data from the sink device over one or more of a display data channel (DDC), a consumer electronics control (CEC) channel, an HDMI Ethernet audio control (HEAC) channel, or a hot plug detect (HPD) channel of the physical HDMI connection.

19. A client device for transmitting data, the client device comprising:
a memory; and
one or more processors in communication with the memory and configured to:
establish a wireless connection with a source device, the client device having a physical high definition multimedia interface (HDMI) connection to a sink device;
receive encapsulated HDMI data over the wireless connection from the source device, the encapsulated HDMI data including encapsulated HDMI video data in a first transport stream having a transport stream format and encapsulated HDMI audio and auxiliary data in a second transport stream having the transport stream format, wherein the second transport stream is separate from the first transport stream, and encapsulated HDMI control and security data in Internet Protocol (IP) datagrams, wherein the IP datagrams are separate from the first transport stream and the second transport stream;

generate, from the encapsulated HDMI data, HDMI data for transmission over the physical HDMI connection without performing any processing of the HDMI data, wherein, to generate the HDMI data, the one or more processors are configured to:
  decapsulate HDMI video data for each of a plurality of color components from video streams of the first transport stream,
  decapsulate HDMI audio and auxiliary data for each of the color components from audio streams of the second transport stream format, and
  insert synchronization control signals, preambles, and guardbands into the HDMI video data and the HDMI audio and auxiliary data; and
transmit the HDMI data to the sink device over the physical HDMI connection.

20. The client device of claim 19, wherein the video streams of the first transport stream are each associated with a packet identifier (PID) for the respective video color component, and the audio streams of the second transport stream are each associated with a PID for the respective audio color component.

21. The client device of claim 19, wherein the one or more processors are configured to transmit the HDMI video data and the HDMI audio and auxiliary data to the sink device over HDMI transition minimized differential signaling (TMDS) channels of the physical HDMI connection.

22. The client device of claim 19, wherein, to generate the HDMI data, the one or more processors are configured to decapsulate HDMI control and security data from the IP datagrams without processing the HDMI control and security data.

23. The client device of claim 22, wherein the one or more processors are configured to transmit the HDMI control and security data to the sink device over at least one of a display data channel (DDC), a consumer electronics control (CEC) channel, or an HDMI Ethernet audio control (HEAC) channel of the physical HDMI connection.

24. The client device of claim 19, wherein the one or more processors are configured to:
  receive HDMI control and security data over the physical HDMI connection with the sink device;
  encapsulate the HDMI control and security data into Internet Protocol (IP) datagrams for transmission over the wireless connection without processing the HDMI control and security data; and
  transmit the encapsulated HDMI control and security data over the wireless connection to the source device.

25. The client device of claim 24, wherein the one or more processors are configured to receive the HDMI control and security data from the sink device over one or more of a display data channel (DDC), a consumer electronics control (CEC) channel, an HDMI Ethernet audio control (HEAC) channel, or a hot plug detect (HPD) channel of the physical HDMI connection.

26. The client device of claim 19, wherein the client device comprises at least one of:
  an integrated circuit;
  a microprocessor; or
  a wireless communication device.

* * * * *